(12) United States Patent
Gornik

(10) Patent No.: US 8,517,313 B2
(45) Date of Patent: Aug. 27, 2013

(54) MECHANICAL VIBRATION DEICING SYSTEM

(76) Inventor: Amihay Gornik, Karmei Yosef (IL)

( * ) Notice: Subject to any disclaimer, the term of this patent is extended or adjusted under 35 U.S.C. 154(b) by 295 days.

(21) Appl. No.: 12/672,459

(22) PCT Filed: Aug. 7, 2008

(86) PCT No.: PCT/IL2008/001086
§ 371 (c)(1),
(2), (4) Date: May 17, 2011

(87) PCT Pub. No.: WO2009/019696
PCT Pub. Date: Feb. 12, 2009

(65) Prior Publication Data
US 2011/0210207 A1    Sep. 1, 2011

(30) Foreign Application Priority Data
Aug. 8, 2007 (IL) .......................................... 185134

(51) Int. Cl.
*B64D 15/16* (2006.01)
(52) U.S. Cl.
USPC .................................... 244/134 R; 244/134 F
(58) Field of Classification Search
USPC ............................... 244/134 R, 134 A, 134 F
See application file for complete search history.

(56) References Cited

U.S. PATENT DOCUMENTS

| | | | |
|---|---|---|---|
| 1,949,787 A | 3/1934 | Dugan | |
| 2,037,626 A | 4/1936 | Hall | |
| 2,135,119 A | 11/1938 | Wood | |
| 2,201,155 A | 5/1940 | Burgress | |
| 2,271,466 A | 1/1942 | Schmidt et al. | |
| 2,297,951 A | 10/1942 | Frank | |
| 2,309,010 A * | 1/1943 | Peter et al. ................. | 244/134 R |
| 3,549,964 A | 12/1970 | Levin et al. | |
| 3,672,610 A | 6/1972 | Levin | |
| 3,779,488 A | 12/1973 | Levin | |
| 3,809,341 A | 5/1974 | Levin et al. | |
| 4,399,967 A | 8/1983 | Sandorff | |
| 4,458,865 A | 7/1984 | Sandorff | |

(Continued)

FOREIGN PATENT DOCUMENTS

| | | |
|---|---|---|
| GB | 523108 A | 7/1940 |
| GB | 2155883 A | 10/1985 |
| WO | WO-2009019696 A2 | 2/2009 |

OTHER PUBLICATIONS

International Search Report and Written Opinion for PCT/Il2008/001086, dated Dec. 8, 2008.

(Continued)

*Primary Examiner* — Timothy D Collins
*Assistant Examiner* — Jamie S Stehle
(74) *Attorney, Agent, or Firm* — Edwards Wildman Palmer LLP

(57) ABSTRACT

An aircraft deicing system including at least one motor operative to drive at least one eccentric mass in rotational motion and at least one displacer coupled to at least one location on at least one aircraft surface and coupled to the at least one eccentric mass such that forces produced by the rotational motion of the eccentric mass are applied to the at least one displacer, causing the at least one displacer to displace the at least one aircraft surface in a plurality of directions at each of the at least one location, thereby causing disengagement of ice from the at least one aircraft surface.

16 Claims, 19 Drawing Sheets

(56) References Cited

U.S. PATENT DOCUMENTS

| | | |
|---|---|---|
| 4,501,398 A | 2/1985 | Sandorff |
| 4,875,644 A | 10/1989 | Adams et al. |
| 5,191,791 A | 3/1993 | Gerardi et al. |
| 5,206,806 A | 4/1993 | Gerardi et al. |
| 7,084,553 B2 | 8/2006 | Ludwiczak |

OTHER PUBLICATIONS

International Preliminary Report on Patentability for PCT/Il2008/001086, dated Feb. 18, 2010.

* cited by examiner

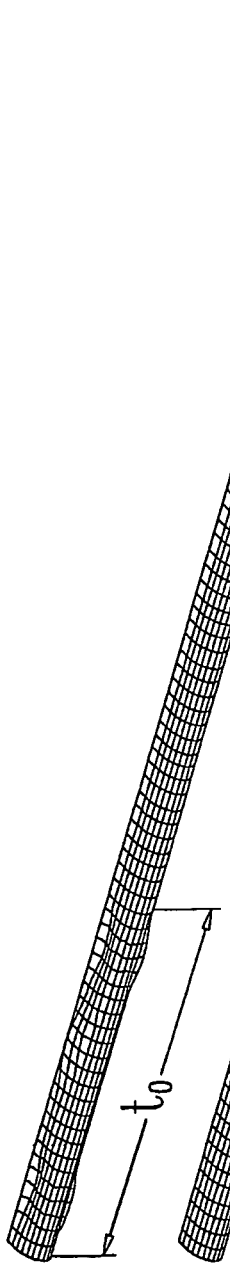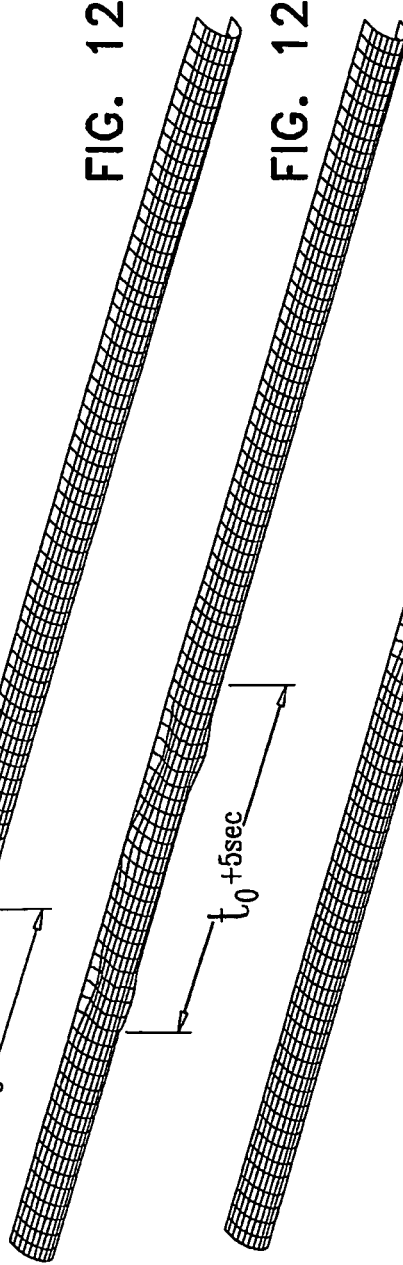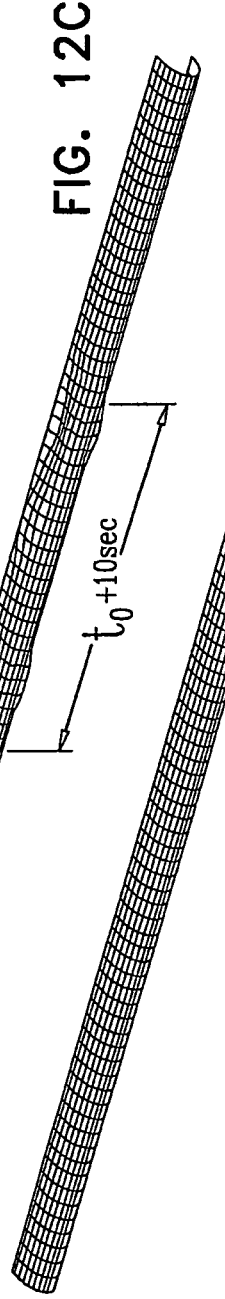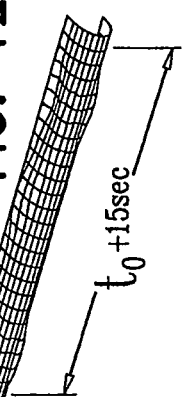

MECHANICAL VIBRATION DEICING SYSTEM

FIELD OF THE INVENTION

The present invention relates to deicing systems and methodologies particularly suited for aircraft and to aircraft employing such deicing systems and methodologies.

BACKGROUND OF THE INVENTION

The following publications are believed to represent the current state of the art: U.S. Pat. Nos. 2,037,626; 2,135,119; 2,297,951; 2,201,155; 3,549,964; 3,672,610; 3,779,488; 3,809,341; 4,875,644; 4,399,967; 4,458,865; 4,501,398; 5,206,806 and 7,084,553.

SUMMARY OF THE INVENTION

The present invention seeks to provide a highly efficient deicing system and methodology particularly suitable for aircraft and aircraft employing such deicing systems and methodologies.

There is thus provided in accordance with a preferred embodiment of the present invention an aircraft deicing system including at least one motor operative to drive at least one eccentric mass in rotational motion and at least one displacer coupled to at least one location on at least one aircraft surface and coupled to the at least one eccentric mass such that forces produced by the rotational motion of the eccentric mass are applied to the at least one displacer, causing the at least one displacer to displace the at least one aircraft surface in a plurality of directions at each of the at least one location, thereby causing disengagement of ice from the at least one aircraft surface.

There is also provided in accordance with another preferred embodiment of the present invention an aircraft including an airframe including at least one aircraft surface, at least one motor operative to drive at least one eccentric mass in rotational motion and at least one displacer coupled to at least one location on at least one aircraft surface and coupled to the at least one eccentric mass such that forces produced by the rotational motion of the eccentric mass are applied to the at least one displacer, causing the at least one displacer to displace the at least one aircraft surface in a plurality of directions at each of the at least one location, thereby causing disengagement of ice from the at least one aircraft surface.

Preferably, the at least one displacer is operative in a cyclic manner, wherein in each cycle the at least one displacer is operative to displace the at least one aircraft surface in a plurality of directions at each of the at least one location. Additionally or alternatively, the aircraft deicing system also includes at least one ice thickness sensor for sensing an ice thickness responsive characteristic of the at least one aircraft surface and at least one controller responsive to an output of the at least one ice thickness sensor indicating the ice thickness responsive characteristic of the at least one aircraft surface for selecting a rotational speed of the at least one motor.

Preferably, the at least one motor drives the at least one eccentric mass in rotational motion about a first axis and at least a portion of at least one of the at least one eccentric mass is selectably displaceable along a second axis generally perpendicular to the first axis.

In accordance with a preferred embodiment of the present invention the at least one motor includes a plurality of motors, each of which is operative to drive an eccentric mass in rotational motion, and the at least one displacer includes a plurality of displacers, each of which is coupled to a location on the aircraft surface and coupled to the eccentric mass such that forces produced by the rotational motion of the eccentric mass are applied to the displacer, causing the displacer to displace the aircraft surface in a plurality of directions at the location. Preferably, each of the plurality of motors and the eccentric mass and displacer associated therewith is operated in a predetermined sequence with respect to others of the plurality of motors, eccentric masses and displacers associated therewith, thereby causing disengagement of ice from the at least one aircraft surface. Additionally, the predetermined sequence produces displacement of the aircraft surface which proceeds therealong in a wavelike progression.

Preferably the at least one aircraft surface includes a leading edge of a wing.

There is further provided in accordance with yet another preferred embodiment of the present invention an aircraft deicing system including at least one ice thickness sensor for sensing an ice thickness responsive characteristic of at least one aircraft surface, at least one selectably controllable ice disengager operative to cause ice to disengage from the at least one aircraft surface and at least one controller responsive to an output of the ice thickness sensor indicating the ice thickness responsive characteristic of the at least one aircraft surface for varying at least frequency of the selectably controllable ice disengager.

Preferably, the at least one selectably controllable ice disengager includes at least one motor operative to drive at least one eccentric mass in rotational motion and at least one displacer coupled to at least one location on at least one aircraft surface and coupled to the at least one eccentric mass such that forces produced by the rotational motion of the eccentric mass are applied to the at least one displacer, causing the at least one displacer to displace the at least one aircraft surface in a plurality of directions at each of the at least one location, thereby causing disengagement of ice from the at least one aircraft surface. Additionally, the at least one displacer is operative in a cyclic manner, wherein in each cycle the at least one displacer is operative to displace the at least one aircraft surface in a plurality of directions at each of the at least one location.

In accordance with a preferred embodiment of the present invention the at least one motor includes a plurality of motors, each of which is operative to drive an eccentric mass in rotational motion, and the at least one displacer includes a plurality of displacers, each of which is coupled to a location on the aircraft surface and coupled to the eccentric mass such that forces produced by the rotational motion of the eccentric mass are applied to the displacer, causing the displacer to displace the aircraft surface in a plurality of directions at the location. Preferably, each of the plurality of motors and the eccentric mass and displacer associated therewith is operated in a predetermined sequence with respect to others of the plurality of motors, eccentric masses and displacers associated therewith, thereby causing disengagement of ice from the at least one aircraft surface. Additionally, the predetermined sequence produces displacement of the aircraft surface which proceeds therealong in a wavelike progression.

BRIEF DESCRIPTION OF THE DRAWINGS

The present invention will be understood and appreciated more fully from the following detailed description, taken in conjunction with the drawings in which:

FIGS. 12A, 12B, 12C and 12D illustrate, in exaggerated form, deformation of an aircraft surface responsive to synchronized operation of multiple separate motor driven displacers of the type illustrated in the deicing system of FIGS. 9-11D in accordance with another preferred embodiment of the present invention.

DETAILED DESCRIPTION OF A PREFERRED EMBODIMENT

Figure 1:
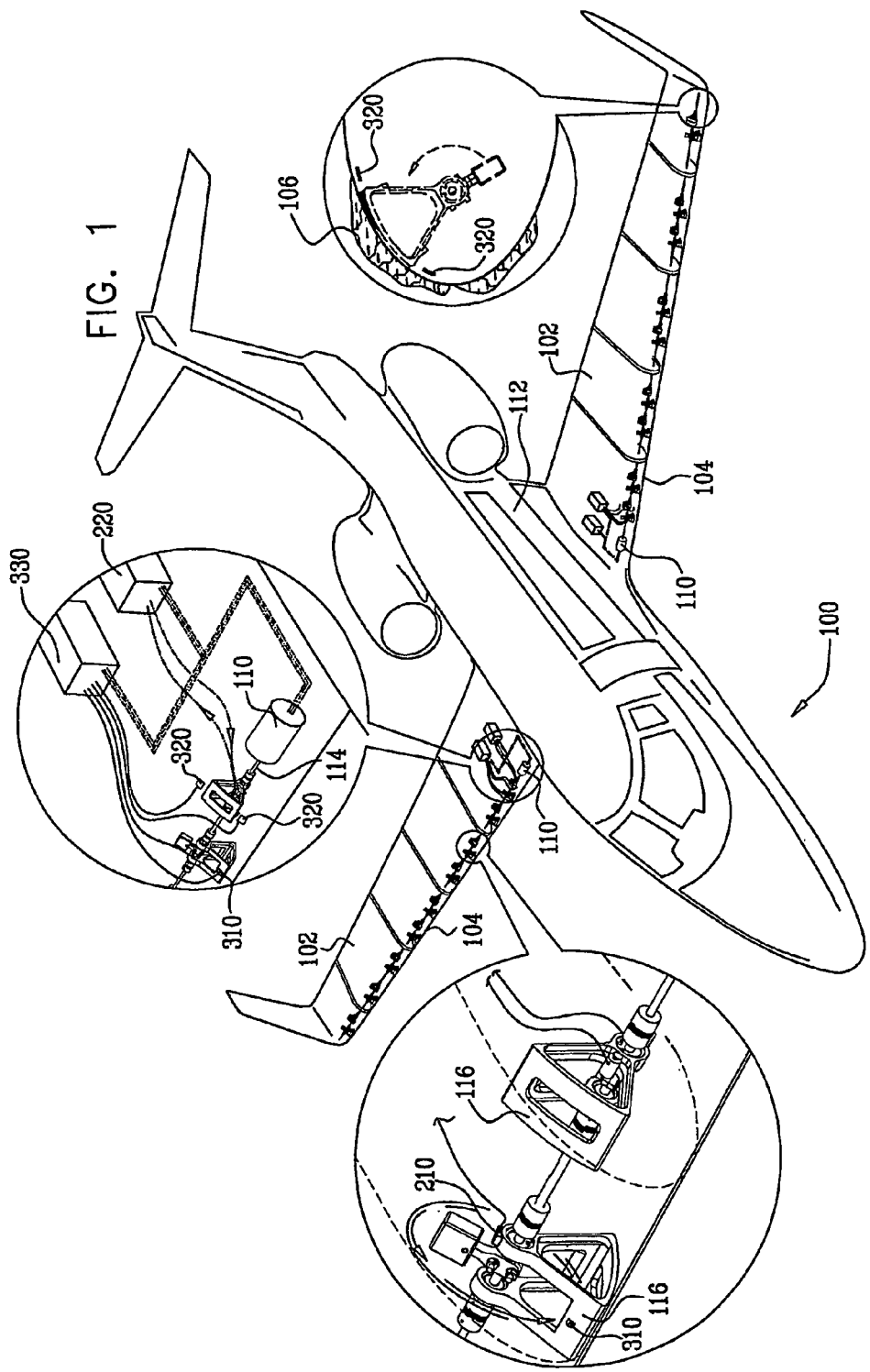
FIG. 1 is a simplified illustration of an aircraft including a deicing system constructed and operative in accordance with a preferred embodiment of the present invention.
Figure 2:
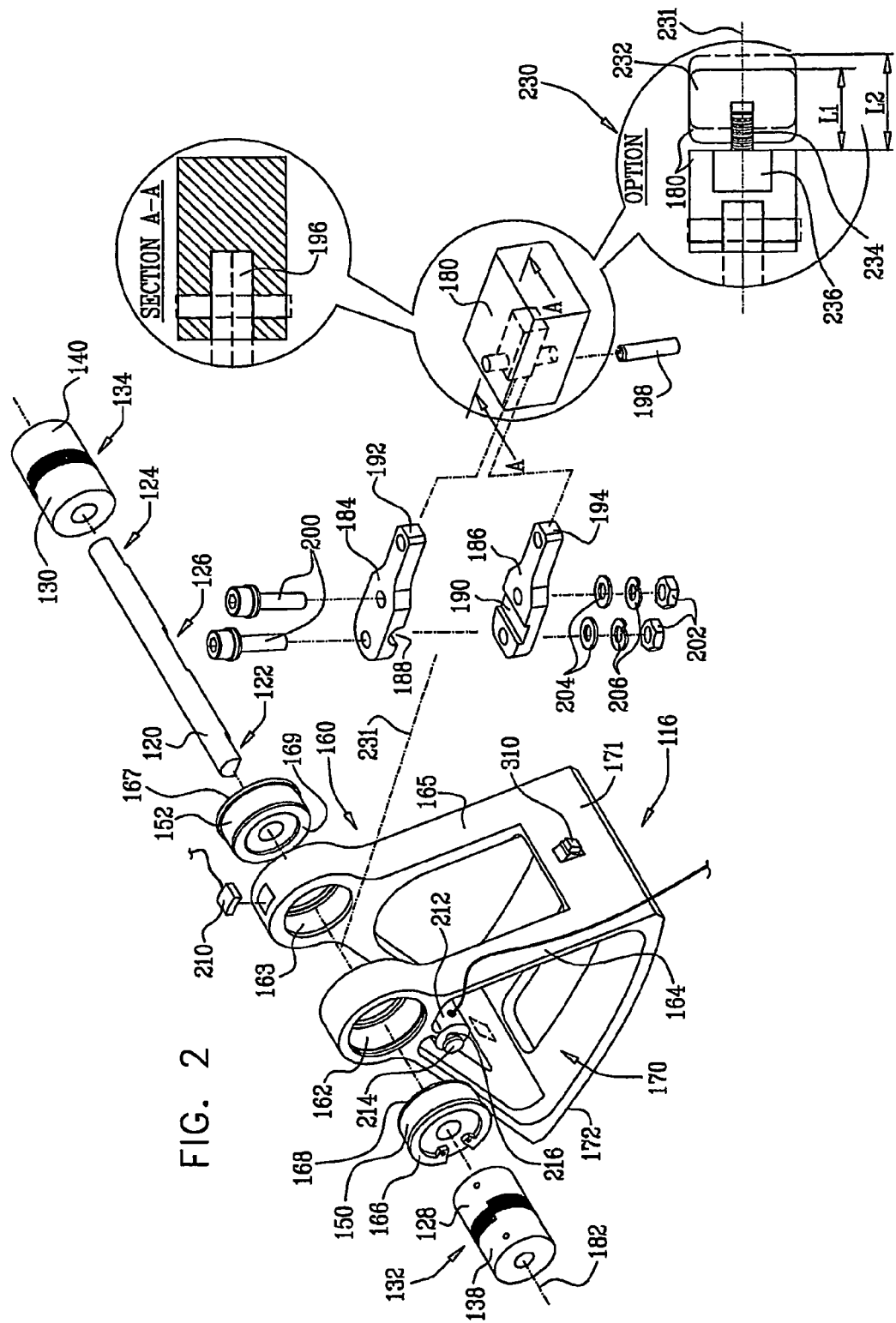
FIG. 2 is a simplified exploded view illustration of part of a preferred embodiment of a deicing system suitable for use in the aircraft of FIG. 1.

Reference is now made to FIG. 1, which is a simplified illustration of an aircraft including a deicing system constructed and operative in accordance with a preferred embodiment of the present invention and to FIG. 2, which is a simplified exploded view illustration of part of a preferred embodiment of a deicing system suitable for use in the aircraft of FIG. 1.

As seen in FIG. 1, there is provided an aircraft 100 equipped with a deicing system constructed and operative in accordance with a preferred embodiment of the present invention. The deicing system is preferably located within the wings 102 of the aircraft adjacent the leading edges 104 of the wings 102. The deicing system may alternatively or additionally be located within the tail or stabilizers of the aircraft.

It is a particular feature of the present invention that the deicing system includes at least one motor operative to drive at least one eccentric mass in rotational motion and at least one displacer coupled to at least one location on at least one aircraft surface, preferably the leading edge 104 of a wing 102, and coupled to the at least one eccentric mass such that forces produced by the rotational motion of the eccentric mass are applied to the at least one displacer, causing the at least one displacer to displace the at least one aircraft surface in a plurality of directions at each of the at least one location, thereby causing disengagement of ice 106 from the at least one aircraft surface.

In the illustrated embodiment, a motor 110, preferably an electric motor and alternatively a fluid driven motor, such as a pneumatic motor, is disposed interiorly of each wing 102 adjacent the leading edge 104 thereof and preferably alongside the aircraft fuselage 112. A drive shaft 114 couples each motor 110, such as a model 3863012C, manufactured by Faulhaber GmbH of Daimlerstrasse 23, 71101 Schonaich, Germany, to a series of displacer assemblies 116. It is appreciated that alternatively multiple motors 110 and multiple drive shafts may each be coupled to a series of displacer assemblies 116 at various locations within each wing.

Turning now particularly to FIG. 2, it is seen that each displacer assembly 116 includes an elongate drive shaft portion 120, preferably having flattened portions 122 and 124 at ends thereof and a flattened portion 126 generally central thereof. Flattened portions 122 and 124 of elongate drive shaft portion 120 are secured as by respective set screws (not shown) to respective first ends 128 and 130 of flexible couplings 132 and 134. Flexible couplings 132 and 134 may be any suitable flexible couplings, such as model CO76A-5M manufactured by Berg W.M., Inc. of 499 Ocean Avenue, East Rockaway, N.Y. 11518 USA. Respective second ends 138 and 140 of flexible couplings 132 and 134 are preferably secured as by respective set screws (not shown) to corresponding flattened ends of drive shaft elements (not shown) which interconnect the various displacer assemblies 116 to each other and to motor 110.

A pair of ball bearings 150 and 152, such as Model 34-5, commercially available from Schaeffler Group—FAG GmbH of Industriestrasse 1-3, Herzogenaurach 91074, Germany, are pressure fit mounted onto drive shaft portion 120 between flattened portion 126 and flattened portions 122 and 124, respectively. A leading edge attachment element 160 is mounted onto drive shaft portion 120 via ball bearings 150 and 152 which engage respective bearing receiving apertures 162 and 163 formed in respective arms 164 and 165 and are fixed thereto by respective lock washers 166 and 167 and wave spring washers 168 and 169. Leading edge attachment element 160 includes a leading edge attachment portion 170, preferably integrally formed with radially extending pairs of arms 164 and 165 each joined by a radially extending generally planar portion 171 and having a curved interior leading edge attachment surface 172 which is fixedly adhered, as by an adhesive, such as product no. 4132 Structural Adhesive Kit, commercially available from 3M, St. Paul, Minn. 55144, USA, to a correspondingly curved interior surface of leading edge 104 of wing 102.

An eccentric drive mass 180 is preferably fixedly mounted to elongate drive shaft portion 120 for rotation together with drive shaft portion 120 about an axis 182. The eccentric drive mass 180 is preferably fixedly mounted to elongate drive shaft portion 120 at flattened portion 126 by means of a pair of suitably configured bracket elements 184 and 186 having respective facing recesses 188 and 190 having cross sectional configurations which respectively match the cross sectional configuration of the drive shaft portion 120 at flattened portion 126. Respective ends 192 and 194 of bracket elements 184 and 186 are retained within a suitable socket 196 of eccentric drive mass 180 by means of a retaining pin 198.

Preferably bracket elements 184 and 186 are held in place by a pair of screws 200 and corresponding nuts 202, washers 204 and lock washers 206.

An acceleration sensor 210, such as a model NMA 1213D commercially available from Freescale Semiconductors Inc., 6501 William Cannon Drive West, Austin, Tex. 78735, USA, is preferably mounted on at least one displacer assembly 116 on each wing of the aircraft in order to serve as an ice thickness sensor, as is described hereinbelow. A variable speed motor 212 having a mass 214 eccentrically mounted on an output shaft 216 thereof is mounted on the same displacer assembly 116. Alternatively, the functionality of motor 212 may be provided by motor 110, when operated at a relatively low frequency, typically 20 Hz.

A deicer controller 220 preferably receives inputs from acceleration sensors 210 associated with the various displacer assemblies 116 and provides control inputs to motor 110. The control logic preferably employed by deicer controller 220 is described hereinbelow with reference to FIG. 5.

According to an alternative embodiment of the present invention, an example of which is illustrated in an enlargement 230 in FIG. 2, some or all of mass 180 may be selectably displaced along an axis 231, generally perpendicular to axis 182, such that the effective distance of the mass 180 from axis 182 may be varied. This provides an additional degree of freedom in controlling the operation of the deicing system of the present invention. When the mass 180 is relatively close to axis 182, it applies relatively little force. As the mass 180 is positioned further from axis 182, the rotation thereof produces corresponding greater force. Thus by controlling the propinquity of mass 180 to axis 182, the amount of force applied to the aircraft surface may be modulated and thus controlled.

In the illustrated embodiment shown in enlargement 230, a part 232 of mass 180 is mounted on a screw drive 234, which may be driven by a motor 236 to adjust the positioning of part 232 of mass 180 along axis 231.

It is appreciated that flexible couplings 132 and 134 are provided so that the force applied by mass 180 during rotation thereof is applied to leading edge 104 through leading edge attachment element 160 rather than through drive shaft 114 to other displacer assemblies 116.

Preferably, additional acceleration sensors 310, such as model NMA 1213D acceleration sensors commercially available from Freescale Semiconductors Inc., 6501 William Cannon Drive West, Austin, Tex. 78735, USA; are preferably mounted on surfaces 171 of at least one displacer assembly 116 on each wing of the aircraft in order to serve as ice presence sensors, as is described hereinbelow. Acceleration sensors 310 are preferably arranged to lie perpendicular to the surface of leading edge 104.

Additionally or alternatively to acceleration sensors 310, strain gages 320, preferably strain gage 062AP commercially available from Vishay Intertechnology Inc., 63 Lancaster Ave., Malvern Pa. 19355, USA, may be mounted onto the curved interior surface of leading edge 104 of wing 102 on either side of curved interior leading edge attachment surface 172. Attachment of the strain gages 320 to the curved interior surface of leading edge 104 preferably employs an adhesive, such as M-Bond 200 Adhesive commercially available from Vishay Intertechnology Inc., 63 Lancaster Ave., Malvern Pa. 19355, USA.

A deicer controller 330 preferably receives inputs from acceleration sensors 310 associated with the various displacer assemblies 116 and strain gages 320 and provides on-off control inputs to motor 110. The control logic preferably employed by deicer controller 330 is described hereinbelow with reference to FIG. 8.

It is appreciated that controllers 220 and 330 may be integrated into a single controller.

Reference is now made to FIGS. 3A, 3B, 3C and 3D, which illustrate four typical stages in a rotation cycle which drives a displacer coupled to an aircraft surface in a deicing system of the type shown in FIGS. 1 and 2, and to FIGS. 4A, 4B, 4C and 4D, which illustrate, in exaggerated form, deformation of an aircraft surface responsive to operation of the deicing system of FIGS. 1 & 2 at stages corresponding to those shown in FIGS. 3A, 3B, 3C and 3D respectively.

Figure 3A:
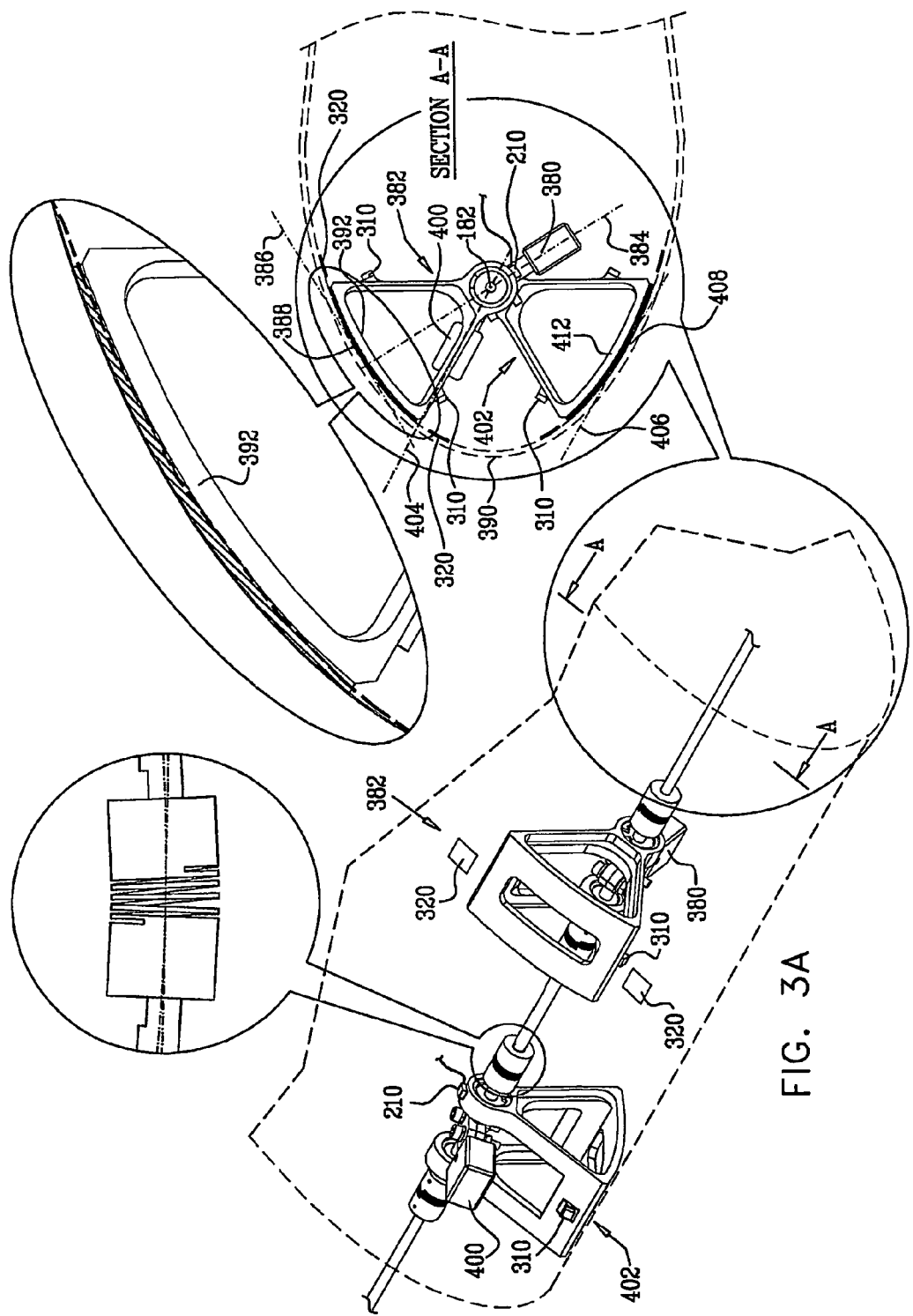
FIGS. 3A, 3B, 3C and 3D illustrate four typical stages in a rotation cycle which drives a displacer coupled to an aircraft surface in a deicing system of the type shown in FIGS. 1 and 2.

As seen in FIG. 3A, an eccentric drive mass 380 of displacer assembly 382 is located along an axis 384 which passes through axis 182 (FIG. 2) and extends generally perpendicular to the plane defined by the tangent 386 to the curved surface 388 of a leading edge 390 to which curved interior leading edge attachment surface 392 of displacer assembly 382 is attached. Inasmuch as mass 380 lies beyond axis 182 with respect to surface 388, the displacer assembly 382 is applying a pull force to the leading edge 390 along axis 384.

As also seen in FIG. 3A, eccentric drive mass 400 of displacer assembly 402 is located along an axis 404 which passes through axis 182 (FIG. 2) and extends generally parallel to the plane defined by the tangent 406 to the curved surface 408 of leading edge 390 to which curved interior leading edge attachment surface 412 of displacer assembly 402 is attached. Inasmuch as mass 400 lies along an axis which is not perpendicular to surface 408, the displacer assembly 402 is applying a bending force to the leading edge 390.

Figure 4A:
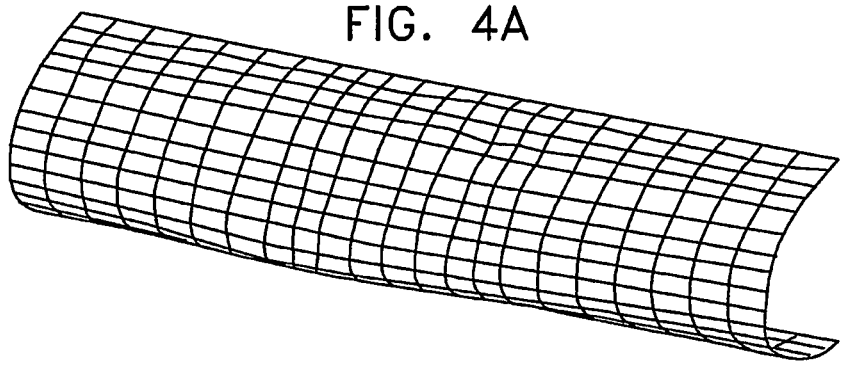
FIGS. 4A, 4B, 4C and 4D illustrate, in exaggerated form, deformation of an aircraft surface responsive to operation of the deicing system of FIGS. 1 & 2 at stages corresponding to those shown in FIGS. 3A, 3B, 3C and 3D, respectively.

FIG. 4A shows, in an exaggerated manner the deformation of the leading edge 390 corresponding to the operational state illustrated in FIG. 3A. The extent of exaggeration is estimated to be a factor of 40.

Figure 3B:
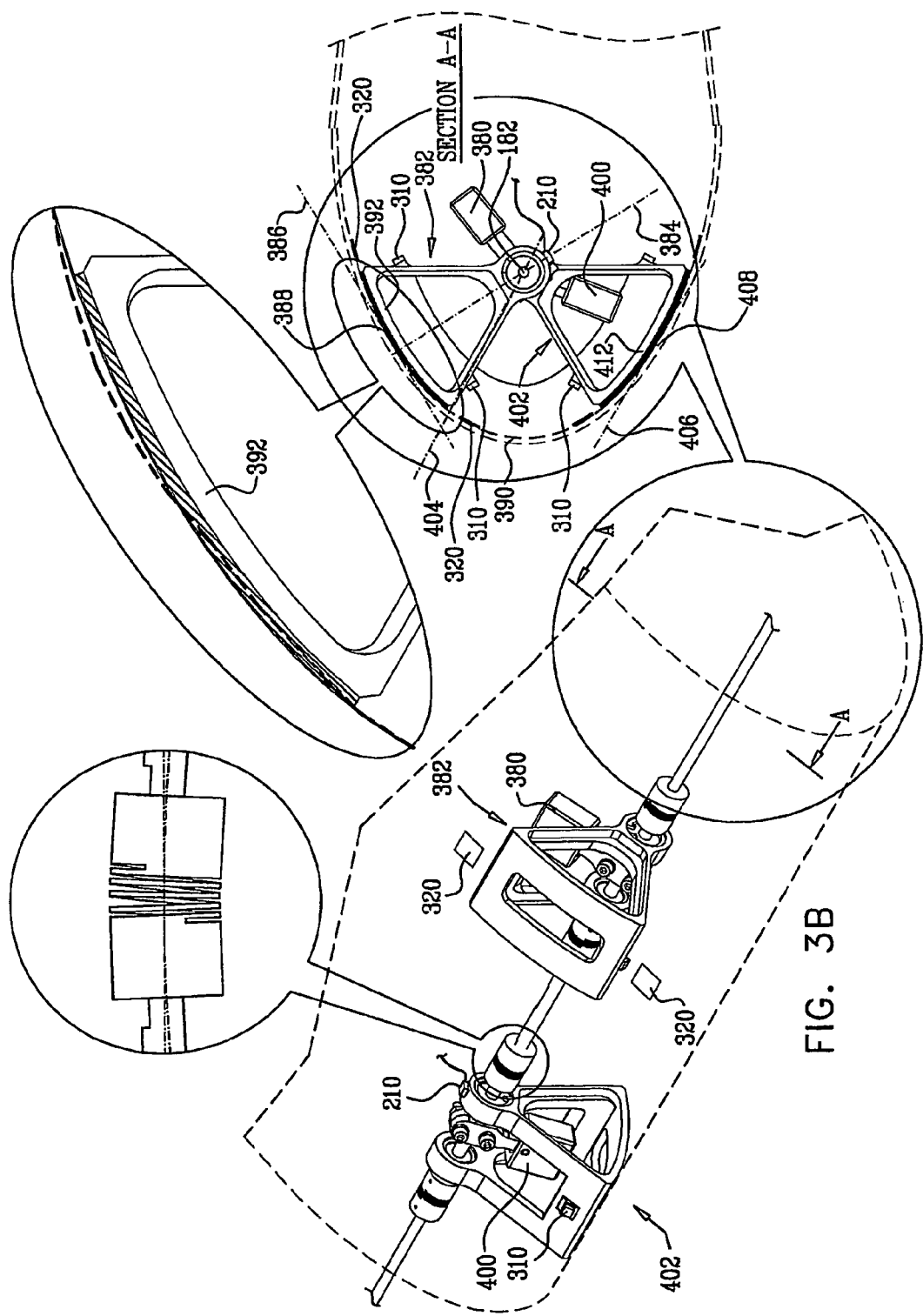

In FIG. 3B, eccentric masses 380 and 400 have been rotated from the position seen in FIG. 3A. As seen in FIG. 3B, eccentric drive mass 380 of displacer assembly 382 is not located along axis 384. Inasmuch as mass 380 lies along an axis which is not perpendicular to surface 388, the displacer assembly 382 is applying a bending force to the leading edge 390.

As also seen in FIG. 3B, eccentric drive mass 400 of displacer assembly 402 is not located along an axis 404 but is nearly perpendicular to axis 404. Inasmuch as mass 400 lies between axis 182 and surface 406, the displacer assembly 402 is applying a push force to the leading edge 390.

Figure 4B:
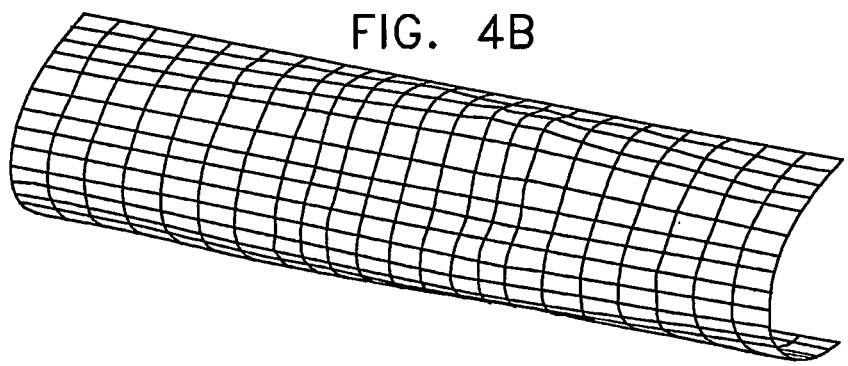

FIG. 4B shows, in an exaggerated manner the deformation of the leading edge 390 corresponding to the operational state illustrated in FIG. 3B. The extent of exaggeration is estimated to be a factor of 40.

Figure 3C:
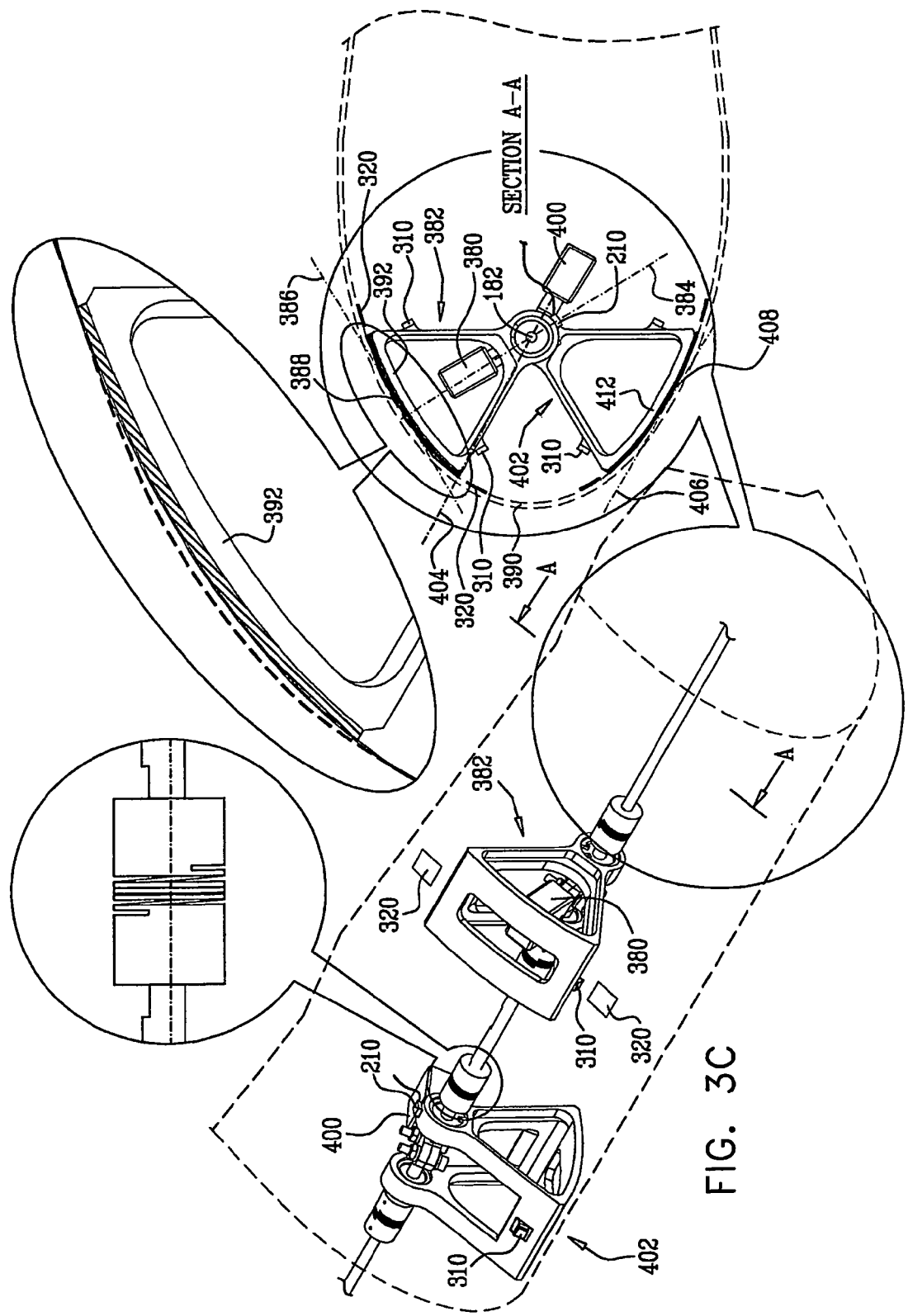

In FIG. 3C, eccentric masses 380 and 400 have been rotated approximately 180° from the position seen in FIG. 3A. As seen in FIG. 3C, eccentric drive mass 380 of displacer assembly 382 is located along axis 384 which passes through axis 182 (FIG. 2) and extends generally perpendicular to the plane defined by tangent 386 to curved surface 388. Inasmuch as mass 380 lies between axis 182 and surface 388, the displacer assembly 382 is applying a push force to the leading edge 390 along axis 384.

As also seen in FIG. 3C, eccentric drive mass 400 of displacer assembly 402 is located along axis 404 which passes through axis 182 (FIG. 2) and extends generally parallel to the plane defined by tangent 406 to curved surface 408. Inasmuch as mass 400 lies along an axis which is not perpendicular to surface 408, the displacer assembly 402 is applying a bending force to the leading edge 390.

Figure 4C:
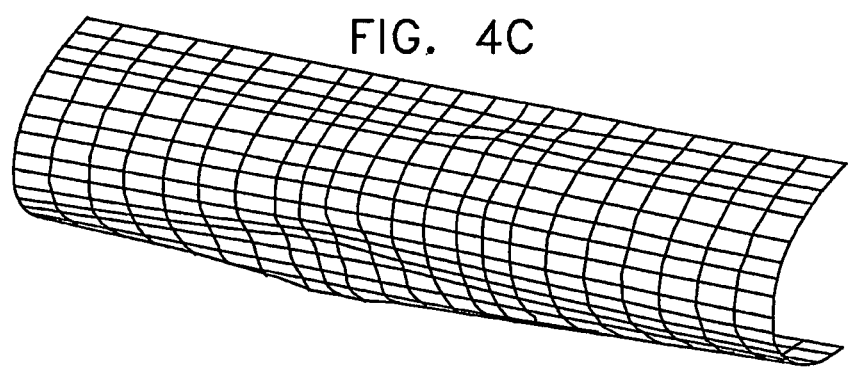

FIG. 4C shows, in an exaggerated manner the deformation of the leading edge 390 corresponding to the operational state illustrated in FIG. 3C. The extent of exaggeration is estimated to be a factor of 40.

Figure 3D:
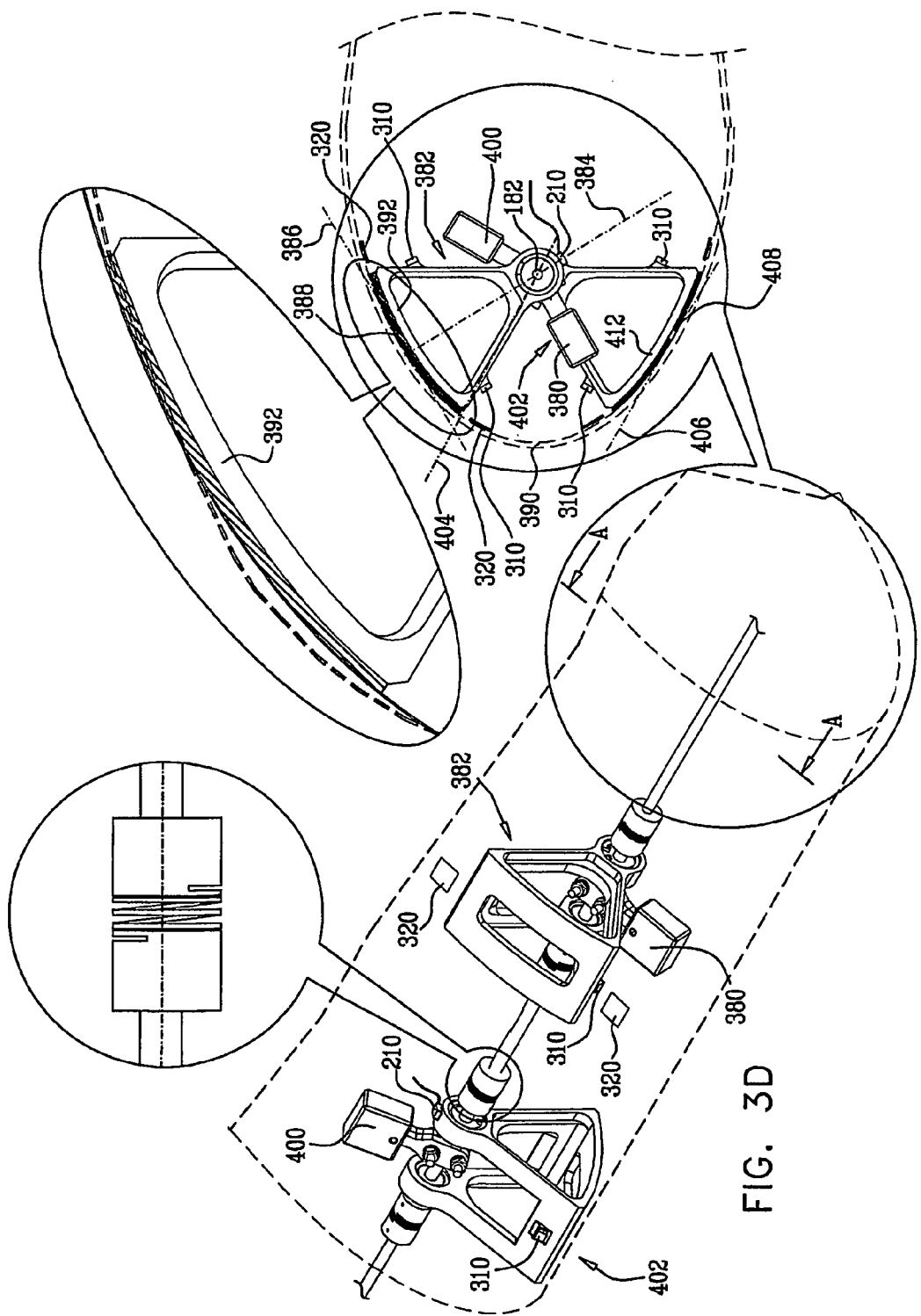

In FIG. 3D, eccentric masses 380 and 400 have been rotated further counterclockwise, as seen from the perspective of the sectional illustration shown along lines A-A therein, from the position seen in FIG. 3A. As seen in FIG. 3D, eccentric drive mass 380 of displacer assembly 382 is not located along axis 384. Inasmuch as mass 380 lies along an axis which is not perpendicular to surface 388, the displacer assembly 382 is applying a bending force to the leading edge 390.

As also seen in FIG. 3D, eccentric drive mass 400 of displacer assembly 402 is not located along an axis 404 but is nearly perpendicular to axis 404. Inasmuch as mass 400 lies beyond axis 182 with respect to surface 406, the displacer assembly 402 is applying a pull force to the leading edge 390.

Figure 4D:
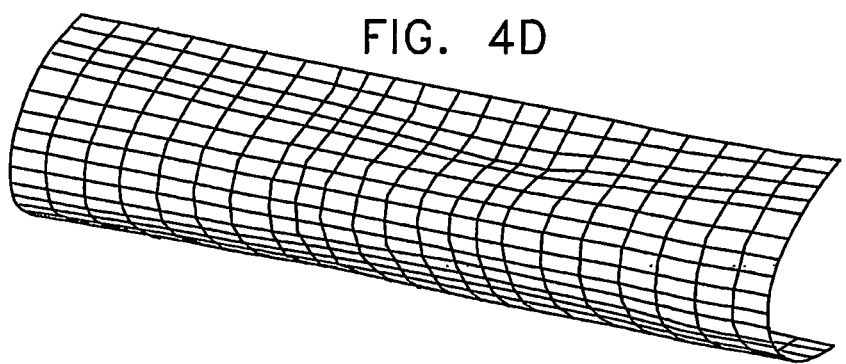

FIG. 4D shows, in an exaggerated manner the deformation of the leading edge 390 corresponding to the operational state illustrated in FIG. 3D. The extent of exaggeration is estimated to be a factor of 40.

Figure 5:
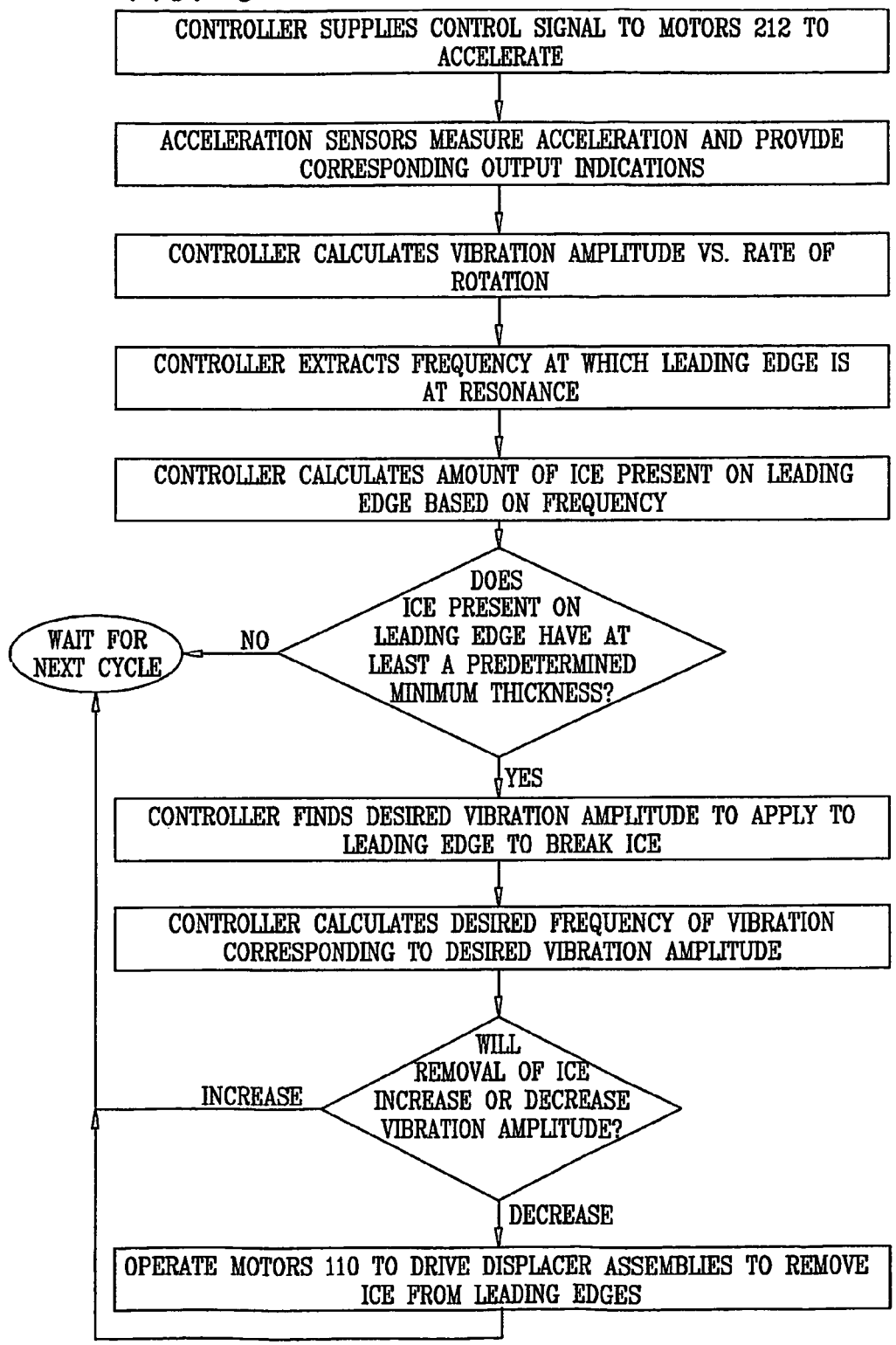
FIG. 5 is a simplified flow chart illustrating one embodiment of control functionality employed in the deicing system of FIGS. 1-4D.
Figure 7:
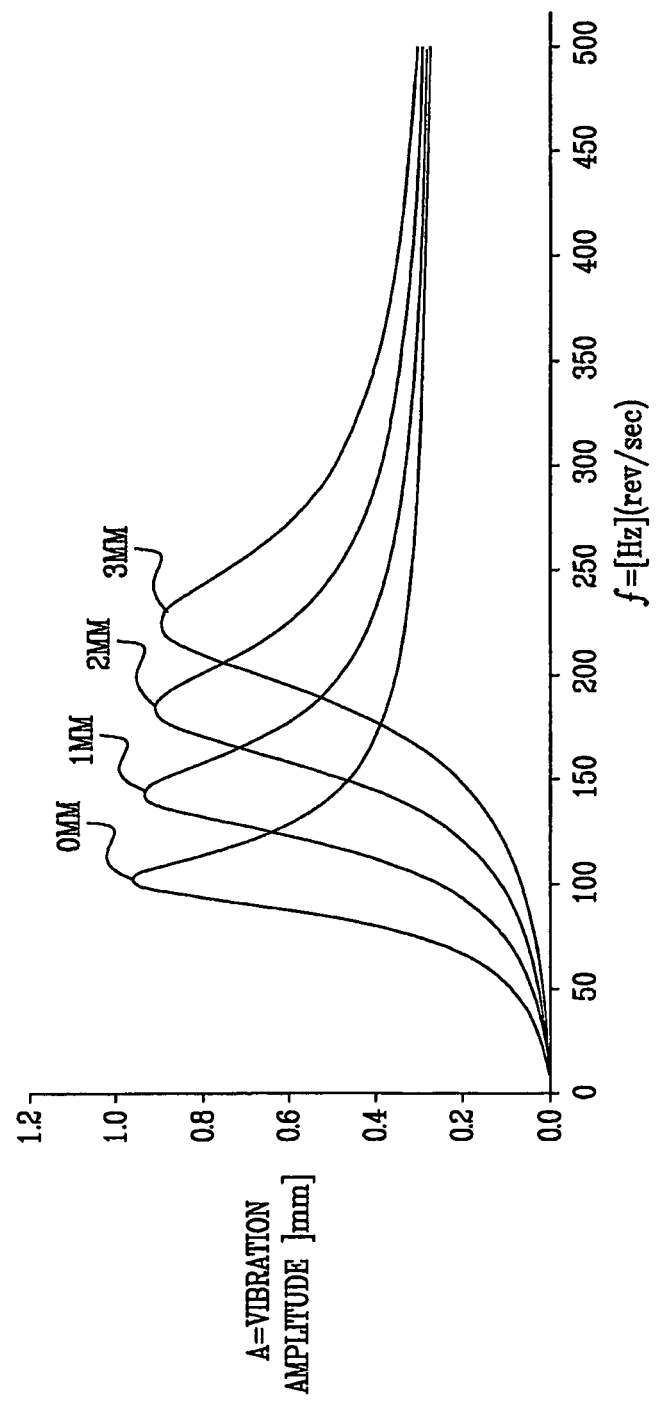
FIG. 7 is a graphical illustration useful in understanding the control functionalities of FIGS. 5 and 6A-6B.

Reference is now made to FIG. 5, which is a simplified flow chart illustrating control functionality employed in the deicing system of FIGS. 1-4D, and to FIG. 7. As seen in FIG. 5, a control signal is preferably supplied by controller 220 to motors 212, causing the motors 212 to accelerate from rest to 500 revolutions/second. Acceleration sensors 210 measure acceleration and provide corresponding output indications to controller 220. Controller 220 calculates vibration amplitude vs. rate of rotation, which represents the frequency response of the leading edge 104 of wing 102 at which the sensor 210 is located. FIG. 7 illustrates examples of empirically derived frequency response curves for various thicknesses of ice on the leading edge 104 of wing 102. Alongside each frequency response curve of FIG. 7 is an indication, as an example, of the ice thickness represented thereby.

The controller 220 extracts the frequency at which the leading edge 104 is at resonance and, based on this frequency, calculates the amount of ice 106 present on the leading edge 104. Additionally, based on prior calibration, the controller 220 makes a determination as to whether the ice 106 present on the leading edge 104 has at least a predetermined minimum thickness, typically 2 mm. If so, the controller 220 then employs a look-up table which indicates, for the thickness of ice 106 present on the leading edge 104, a desired vibration amplitude that should be applied to the leading edge 104 to break the ice 106.

Prior to operating motors 110, the controller 220 calculates the desired frequency of vibration corresponding to the desired vibration amplitude and makes a determination of whether, once the ice 106 is removed, the vibration amplitude will increase or decrease.

In accordance with one embodiment of the invention, only if at the desired frequency of vibration corresponding to the desired vibration amplitude, the vibration amplitude will decrease once the ice 106 is removed, are motors 110 operated to drive displacer assemblies 116 to remove the ice 106 from the leading edges 104 of wings 102. Otherwise, the thickness of the ice 106 will be allowed to increase until, at the desired frequency of vibration corresponding to the desired vibration amplitude, the vibration amplitude will decrease once the ice 106 is removed.

Alternatively other operational techniques for preventing undesired increase in vibration amplitude of the aircraft surface following ice disengagement therefrom may be employed.

The functionality of FIG. 5 preferably takes place intermittently at predetermined intervals, typically 10 minutes. The operation of motors 110 preferably takes place upon each actuation for a predetermined number of revolutions, typically 100 revolutions. Alternatively, the cycle of operation described hereinabove is repeated intermittently at intervals which depend on the altitude and flying conditions of the aircraft. Additionally or alternatively, the cycle of operation described hereinabove is repeated intermittently at intervals which depend on the thickness of the ice 106 present on the leading edge 104.

If the functionality of FIG. 8, described hereinbelow, is employed, that part of the functionality of FIG. 5 which calculates the amount of ice present on the leading edge based on frequency is not employed. The remainder of the functionality of FIG. 5 operates when the functionality of FIG. 8 indicates the presence of at least a predetermined thickness of ice 106 on the leading edge 104.

Figure 6A:
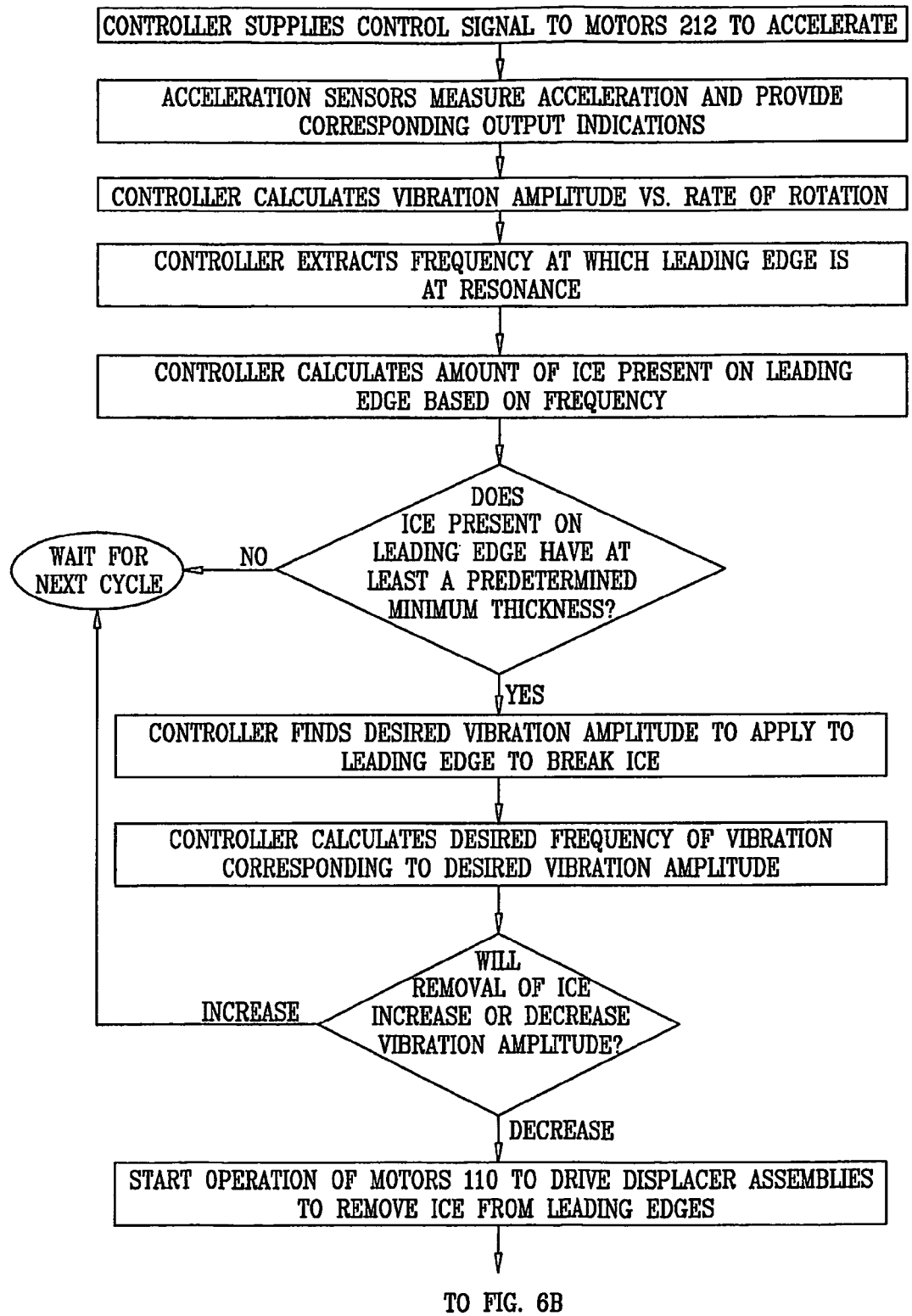
FIGS. 6A and 6B, taken together, are a simplified flow chart illustrating another embodiment of control functionality employed in the deicing system of FIGS. 1-4D.
Figure 6B:
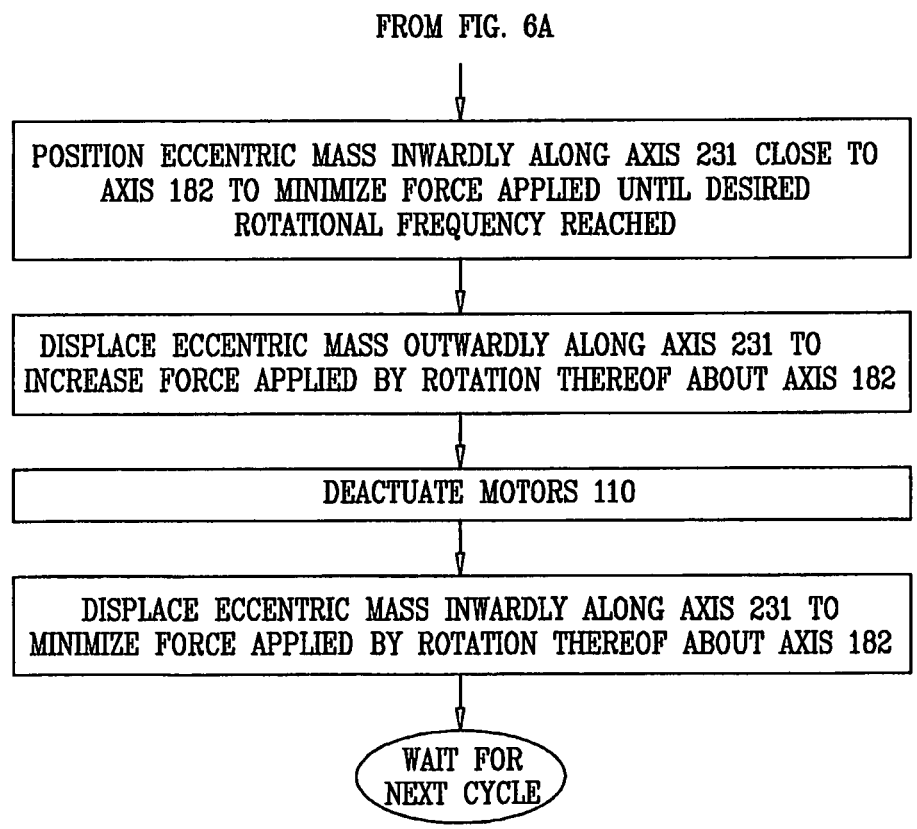

Reference is now made to FIGS. 6A and 6B, which, taken together, are a simplified flow chart illustrating alternative control functionality which may be employed in the alternative embodiment of deicing system of FIGS. 1-4D when some or all of mass 180 may be selectably displaced along axis 231 such that effective distance of the mass 180 from axis 182 may be varied.

As seen in FIGS. 6A and 6B, and similarly to the functionality of FIG. 5, a control signal is preferably supplied by controller 220 to motors 212, causing the motors 212 to accelerate from rest to 500 revolutions/second. Acceleration sensors 210 measure acceleration and provide corresponding output indications to controller 220. Controller 220 calculates vibration amplitude vs. rate of rotation, which represents the frequency response of the leading edge 104 of wing 102 at which the sensor 210 is located.

The controller 220 extracts the frequency at which the leading edge 104 is at resonance and, based on this frequency, calculates the amount of ice 106 present on the leading edge 104. Additionally, based on prior calibration, the controller 220 makes a determination as to whether the ice 106 present on the leading edge 104 has at least a predetermined minimum thickness, typically 2 mm. If so, the controller 220 then employs a look-up table which indicates, for the thickness of ice 106 present on the leading edge 104, a desired vibration amplitude that should be applied to the leading edge 104 to break the ice 106.

Prior to operating motors 110, the controller 220 calculates the desired frequency of vibration corresponding to the desired vibration amplitude and makes a determination of whether, once the ice 106 is removed, the vibration amplitude will increase or decrease. Only if at the desired frequency of vibration corresponding to the desired vibration amplitude, the vibration amplitude will decrease once the ice 106 is removed, are motors 110 operated to drive displacer assemblies 116 to remove the ice 106 from the leading edges 104 of wings 102.

At this stage, as distinguished from the functionality of FIG. 5, the eccentric mass 180 is positioned along axis 231 so as to be close to axis 182 such that the force applied by rotation of mass 180 is minimized until such time as the rotational frequency of motor 110 reached the desired frequency. Once the rotational frequency of motor 110 reaches the desired frequency, the eccentric mass 180 is displaced outwardly along axis 231 so as to increase the force applied by rotation thereof about axis 182.

The functionality of FIGS. 6A and 6B preferably takes place intermittently at predetermined intervals, typically 10 minutes. Alternatively the cycle of operation described hereinabove is repeated intermittently at intervals which depend on the altitude and other flying conditions of the aircraft. Additionally or alternatively, the cycle of operation described hereinabove is repeated intermittently at intervals which depend on the thickness of the ice 106 present on the leading edge 104.

The operation of motors 110 preferably takes place upon each actuation for a predetermined number of revolutions, typically 100 revolutions. Furthermore, once motors 110 are deactuated, the eccentric mass 180 is immediately displaced along axis 231 so as to be close to axis 182 so as to immediately minimize the force applied by rotation thereof as motors 110 decelerate to rest.

Figure 8:
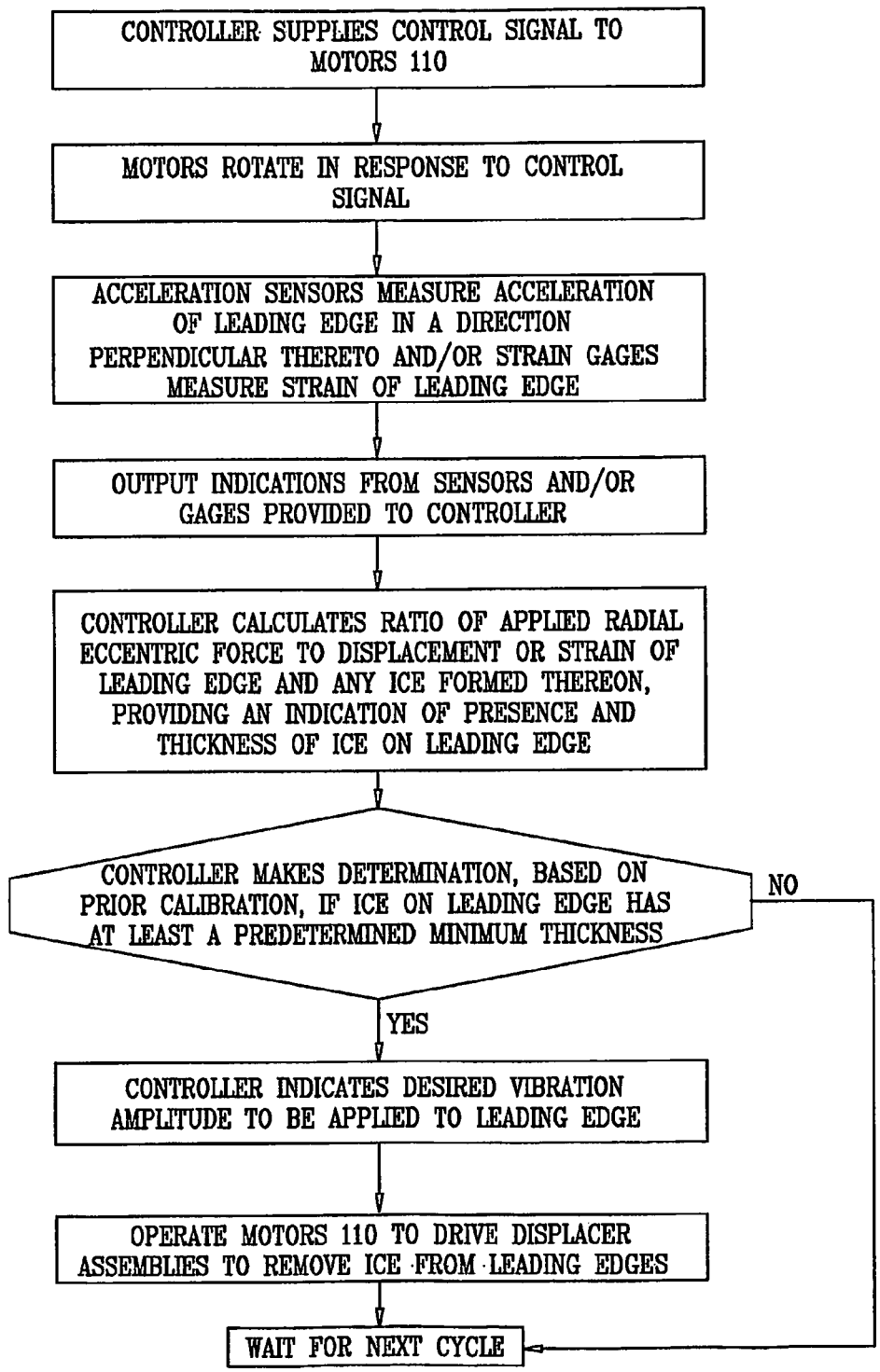
FIG. 8 is a simplified flow chart illustrating a further embodiment of control functionality employed in the deicing system of FIGS. 1-4D employing additional acceleration sensors and/or strain gages.

Reference is now made to FIG. 8, which is a simplified flow chart illustrating control functionality employed in the deicing system of FIGS. 1-4D particularly using acceleration sensors 310 and/or strain gages 320. As seen in FIG. 8, a control signal is preferably supplied by controller 330 to motors 110, causing the motors 110 to rotate at 60 revolutions/second. Acceleration sensors 310 measure acceleration of the leading edge in a direction perpendicular thereto and/or strain gages 320 measure the strain of the leading edge 390 in the plane illustrated in sections A-A in FIGS. 3A-3D and provide corresponding output indications to controller 330.

Controller 330 calculates ratio of the applied radial eccentric force to the displacement of the leading edge 390 and any ice formed thereon, which represents the stiffness of the leading edge 390 of wing 102 adjacent which acceleration sensors 310 and/or strain gages 320 are located together with any ice 106 formed thereon. This provides an indication of the presence and thickness of ice 106 on the leading edge 104.

Additionally, based on prior calibration, the controller 330 makes a determination as to whether the ice 106 present on the leading edge 104 has at least a predetermined minimum thickness, typically 2 mm. If so, controller 220, as described hereinabove with reference to FIG. 5, then indicates a desired vibration amplitude that should be applied to the leading edge 104 to remove the ice 106.

The functionality of FIG. 8 preferably takes place intermittently at predetermined intervals, typically 1-10 minutes. Alternatively, the cycle of operation described hereinabove is repeated intermittently at intervals which depend on the altitude and flying conditions of the aircraft. Additionally or alternatively, the cycle of operation described hereinabove is repeated intermittently at intervals which depend on the thickness of the ice 106 present on the leading edge 104.

Figure 9:
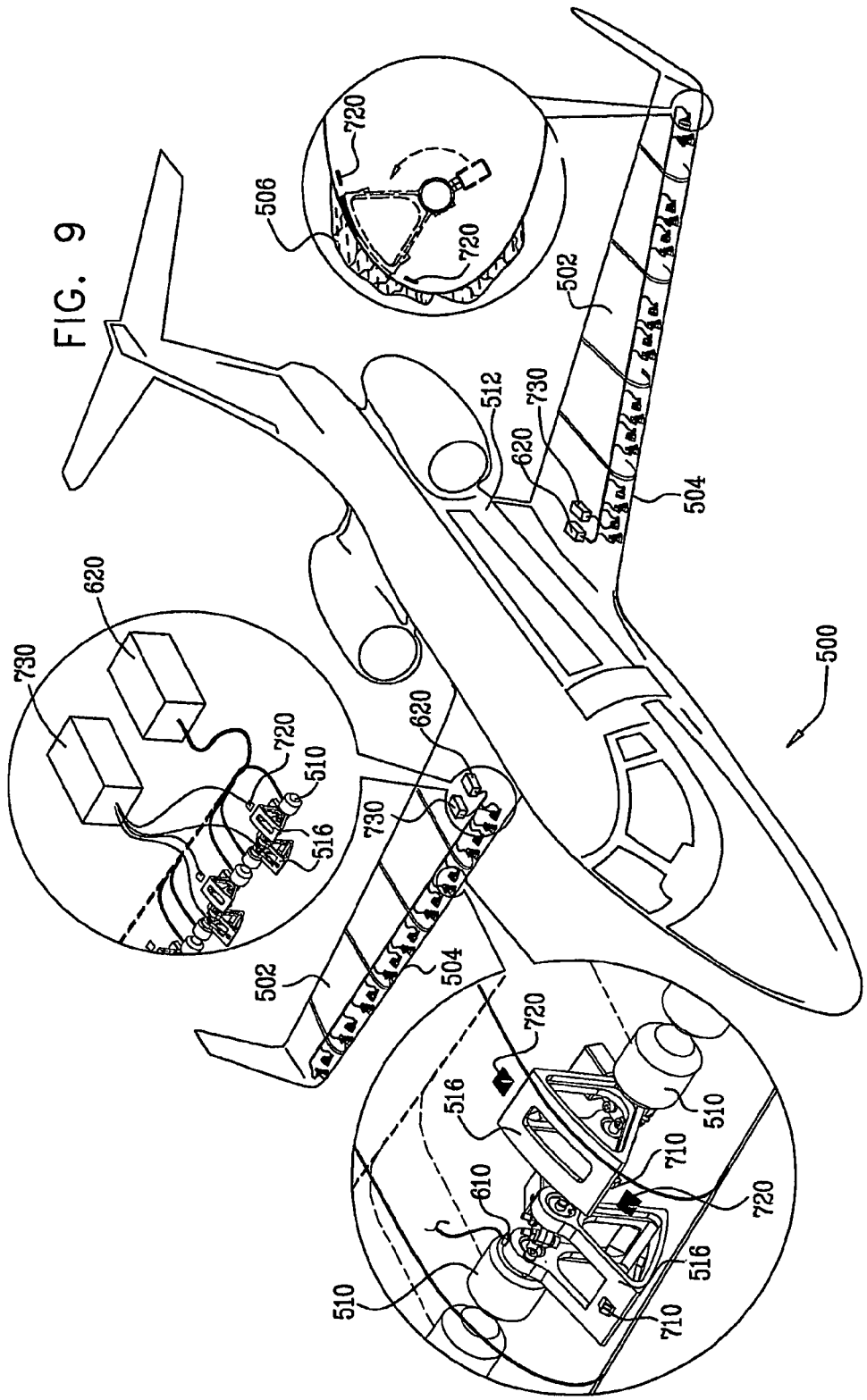
FIG. 9 is a simplified illustration of an aircraft including a deicing system constructed and operative in accordance with another preferred embodiment of the present invention.
Figure 10:
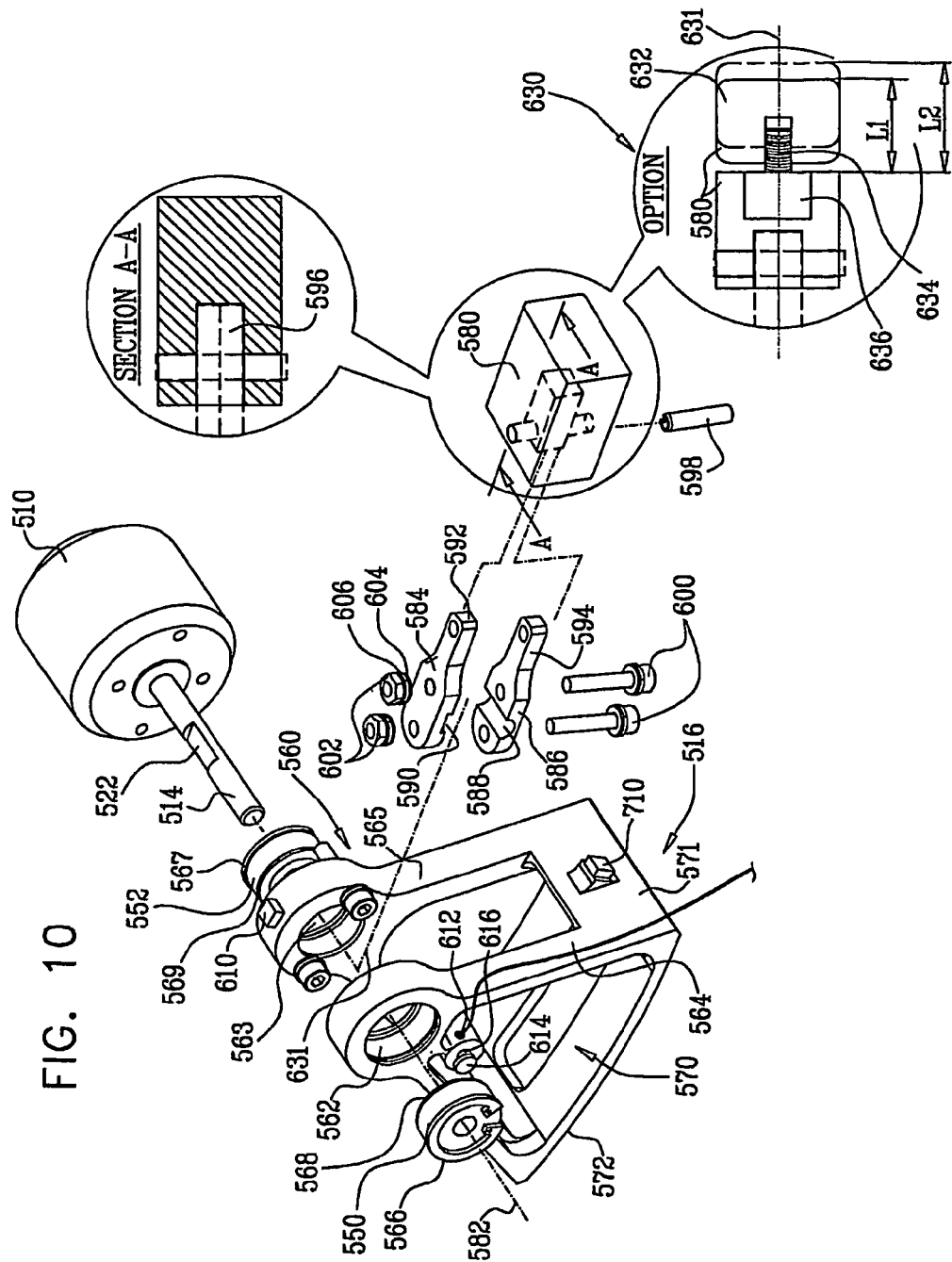
FIG. 10 is a simplified exploded view illustration of part of a preferred embodiment of a deicing system suitable for use in the aircraft of FIG. 9.

Reference is now made to FIG. 9, which is a simplified illustration of an aircraft including a deicing system constructed and operative in accordance with another preferred embodiment of the present invention and to FIG. 10, which is a simplified exploded view illustration of part of another preferred embodiment of a deicing system suitable for use in the aircraft of FIG. 9.

As seen in FIG. 9, there is provided an aircraft 500 equipped with a deicing system constructed and operative in accordance with a preferred embodiment of the present invention. The deicing system is preferably located within the wings 502 of the aircraft adjacent the leading edges 504 of the wings 502. The deicing system may alternatively or additionally be located within the tail or stabilizers of the aircraft.

It is a particular feature of the present invention that the deicing system includes at least one motor operative to drive at least one eccentric mass in rotational motion and at least one displacer coupled to at least one location on at least one aircraft surface, preferably the leading edge 504 of a wing 502, and coupled to the at least one eccentric mass such that forces produced by the rotational motion of the eccentric mass are applied to the at least one displacer, causing the at least one displacer to displace the at least one aircraft surface in a plurality of directions at each of the at least one location, thereby causing disengagement of ice 506 from the at least one aircraft surface.

In the illustrated embodiment, a motor 510, preferably an electric motor and alternatively a fluid driven motor, such as a pneumatic motor, is disposed interiorly of each wing 502 adjacent the leading edge 504 thereof and preferably alongside the aircraft fuselage 512. A drive shaft 514 couples each motor 510, such as a model A30-16M motor, commercially available from Hacker Brushless, 2122 West 5$^{th}$ Place, Tempe, Ariz. 85281, USA, to a corresponding displacer assembly 516. It is appreciated that multiple motors 510 and multiple drive shafts 514 are preferably each coupled to a corresponding displacer assembly 516 at various locations within each wing.

Turning now particularly to FIG. 10, it is seen that each drive shaft 514 includes a flattened portion 522 generally central thereof.

A pair of ball bearings 550 and 552, such as Model 34-5, commercially available from Schaeffler Group—FAG GmbH of Industriestrasse 1-3, Herzogenaurach 91074, Germany, are pressure fit mounted onto drive shaft 514 on respective opposite sides of flattened portion 522. A leading edge attachment element 560 is mounted onto drive shaft portion 514 via ball bearings 550 and 552 which engage respective bearing receiving apertures 562 and 563 formed in respective arms 564 and 565 and are fixed thereto by respective lock washers 566 and 567 and wave spring washers 568 and 569.

Leading edge attachment element 560 includes a leading edge attachment portion 570, preferably integrally formed with radially extending pairs of arms 564 and 565 each joined by a radially extending generally planar portion 571 and having a curved interior leading edge attachment surface 572 which is fixedly adhered, as by an adhesive, such as product no. 4132 Structural Adhesive Kit, commercially available from 3M, St. Paul, Minn. 55144, USA, to a correspondingly curved interior surface of leading edge 504 of wing 502.

An eccentric drive mass 580 is preferably fixedly mounted to drive shaft 514 for rotation together therewith about an axis 582. The eccentric drive mass 580 is preferably fixedly mounted to drive shaft 514 at flattened portion 522 by means of a pair of suitably configured bracket elements 584 and 586 having respective facing recesses 588 and 590, having cross sectional configurations which respectively match the cross sectional configuration of the drive shaft 514 at flattened portion 522. Respective ends 592 and 594 of bracket elements 584 and 586 are retained within a suitable socket 596 of eccentric drive mass 580 by means of a retaining pin 598.

Preferably bracket elements 584 and 586 are held in place by a pair of screws 600 and corresponding nuts 602, washers 604 and lock washers 606.

An acceleration sensor 610, such as a model NMA 1213D commercially available from Freescale Semiconductors Inc., 6501 William Cannon Drive West, Austin, Tex. 78735, USA, is preferably mounted on at least one displacer assembly 516 on each wing of the aircraft in order to serve as an ice thickness sensor, as is described hereinbelow. A variable speed motor 612, having a mass 614 eccentrically mounted on an output shaft 616 thereof, is mounted on the same displacer assembly 516. Alternatively, the functionality of motor 612 may be provided by motor 510, when operated at a relatively low frequency, typically 20 Hz.

A deicer controller 620 preferably receives inputs from acceleration sensors 610 associated with various displacer assemblies 516 and provides control inputs to motors 510. The control logic preferably employed by deicer controller 620 is described hereinabove with reference to FIG. 5 and FIG. 8 as described hereinabove.

According to an alternative embodiment of the present invention, an example of which is illustrated in an enlargement 630 in FIG. 10, some or all of mass 580 may be selectably displaced along an axis 631, generally perpendicular to axis 582, such that the effective distance of the mass 580 from axis 582 may be varied. This provides an additional degree of freedom in controlling the operation of the deicing system of the present invention. In the illustrated embodiment shown in enlargement 630, a part 632 of mass 580 is mounted on a screw drive 634, which may be driven by a motor 636 to adjust the positioning of part 632 of mass 580 along axis 631.

Preferably additional acceleration sensors 710, such as model NMA 1213D acceleration sensors commercially available from Freescale Semiconductors Inc., 6501 William Cannon Drive West, Austin, Tex. 78735, USA, are preferably mounted on portions 571 of at least one displacer assembly 516 on each wing of the aircraft in order to serve as ice presence sensors, as is described hereinbelow. Acceleration sensors 710 are preferably arranged to lie perpendicular to the surface of leading edge 504.

Additionally or alternatively to acceleration sensors 710, strain gages 720, preferably strain gage 062AP commercially available from Vishay Intertechnology Inc., 63 Lancaster Ave., Malvern Pa. 19355, USA, may be mounted onto the curved interior surface of leading edge 504 of wing 502 on either side of curved interior leading edge attachment surface 572. Attachment of the strain gages 720 to the curved interior surface of leading edge 504 preferably employs an adhesive, such as M-Bond 200 Adhesive commercially available from Vishay Intertechnology Inc., 63 Lancaster Ave., Malvern Pa. 19355, USA.

A deicer controller 730 preferably receives inputs from acceleration sensors 710 associated with the various displacer assemblies 516 and strain gages 720 and provides on-off control inputs to motors 510. The control logic preferably employed by deicer controller 730 is described hereinabove with reference to FIG. 8.

It is appreciated that controllers 620 and 730 may be integrated into a single controller.

Reference is now made to FIGS. 11A, 1113, 11C and 11D, which illustrate four typical stages in a rotation cycle which drives a displacer coupled to an aircraft surface in a deicing system of the type shown in FIGS. 9 and 10, and to FIGS. 4A, 4B, 4C and 4D, which illustrate, in exaggerated form, deformation of an aircraft surface responsive to operation of the deicing system of FIGS. 9 and 10 at stages corresponding to those shown in FIGS. 11A, 11B, 11C and 11D respectively.

Figure 11A:
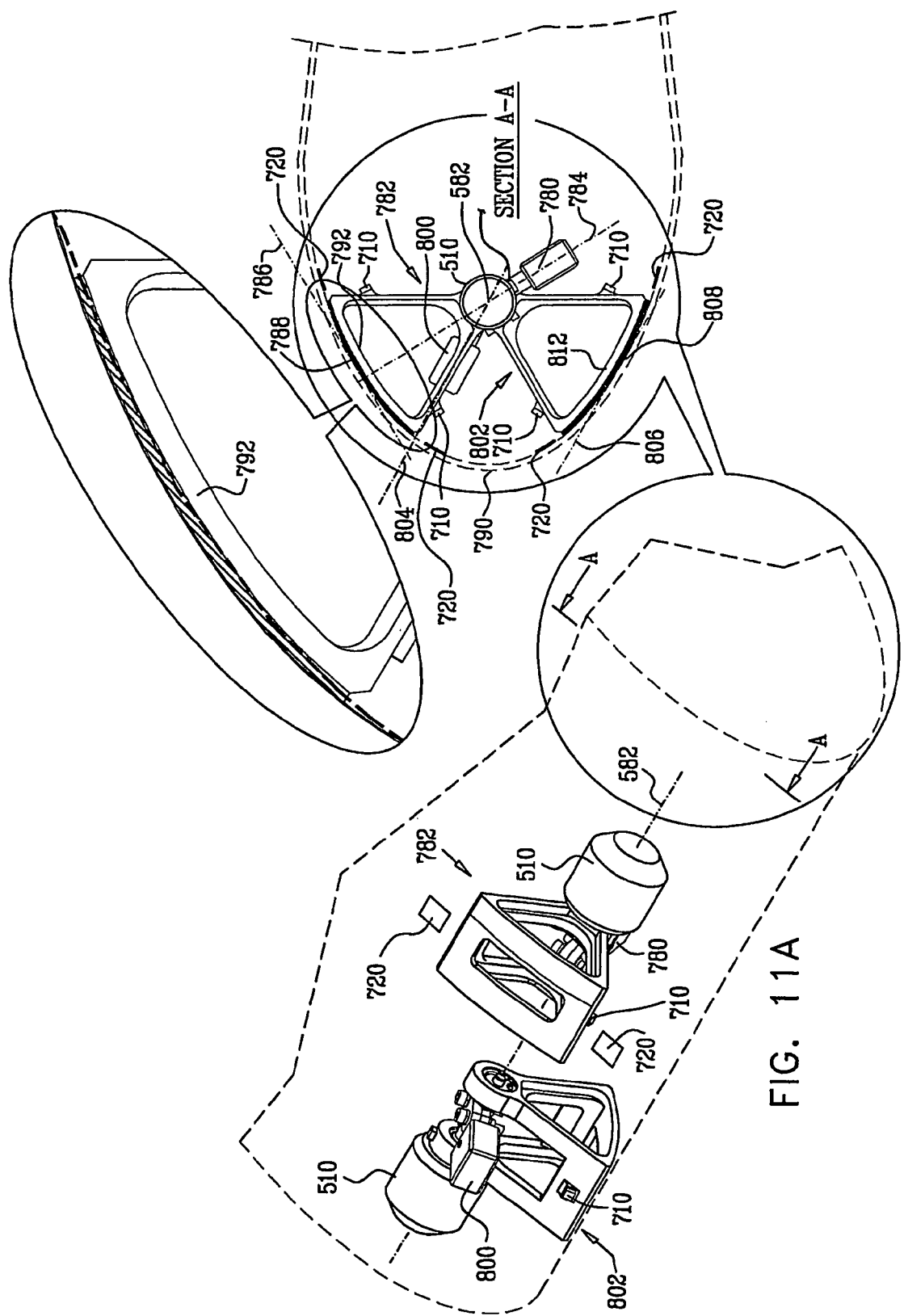
FIGS. 11A, 11B, 11C and 11D illustrate four typical stages in a rotation cycle which drives a displacer coupled to an aircraft surface in a deicing system of the type shown in FIGS. 9 and 10.

As seen in FIG. 11A, an eccentric drive mass 780 of displacer assembly 782 is located along an axis 784 which passes through axis 582 (FIG. 10) and extends generally perpendicular to the plane defined by the tangent 786 to the curved surface 788 of a leading edge 790 to which curved interior leading edge attachment surface 792 of displacer assembly 782 is attached. Inasmuch as mass 780 lies beyond axis 582 with respect to surface 788, the displacer assembly 782 is applying a pull force to the leading edge 790 along axis 784.

As also seen in FIG. 11A, eccentric drive mass 800 of displacer assembly 802 is located along an axis 804 which passes through axis 582 (FIG. 10) and extends generally parallel to the plane defined by the tangent 806 to the curved surface 808 of leading edge 790 to which curved interior leading edge attachment surface 812 of displacer assembly 802 is attached. Inasmuch as mass 800 lies along an axis which is not perpendicular to surface 808, the displacer assembly 802 is applying a bending force to the leading edge 790.

FIG. 4A shows, in an exaggerated manner, the deformation of the leading edge 790 corresponding to the operational state illustrated in FIG. 11A. The extent of exaggeration is estimated to be a factor of 40.

Figure 11B:
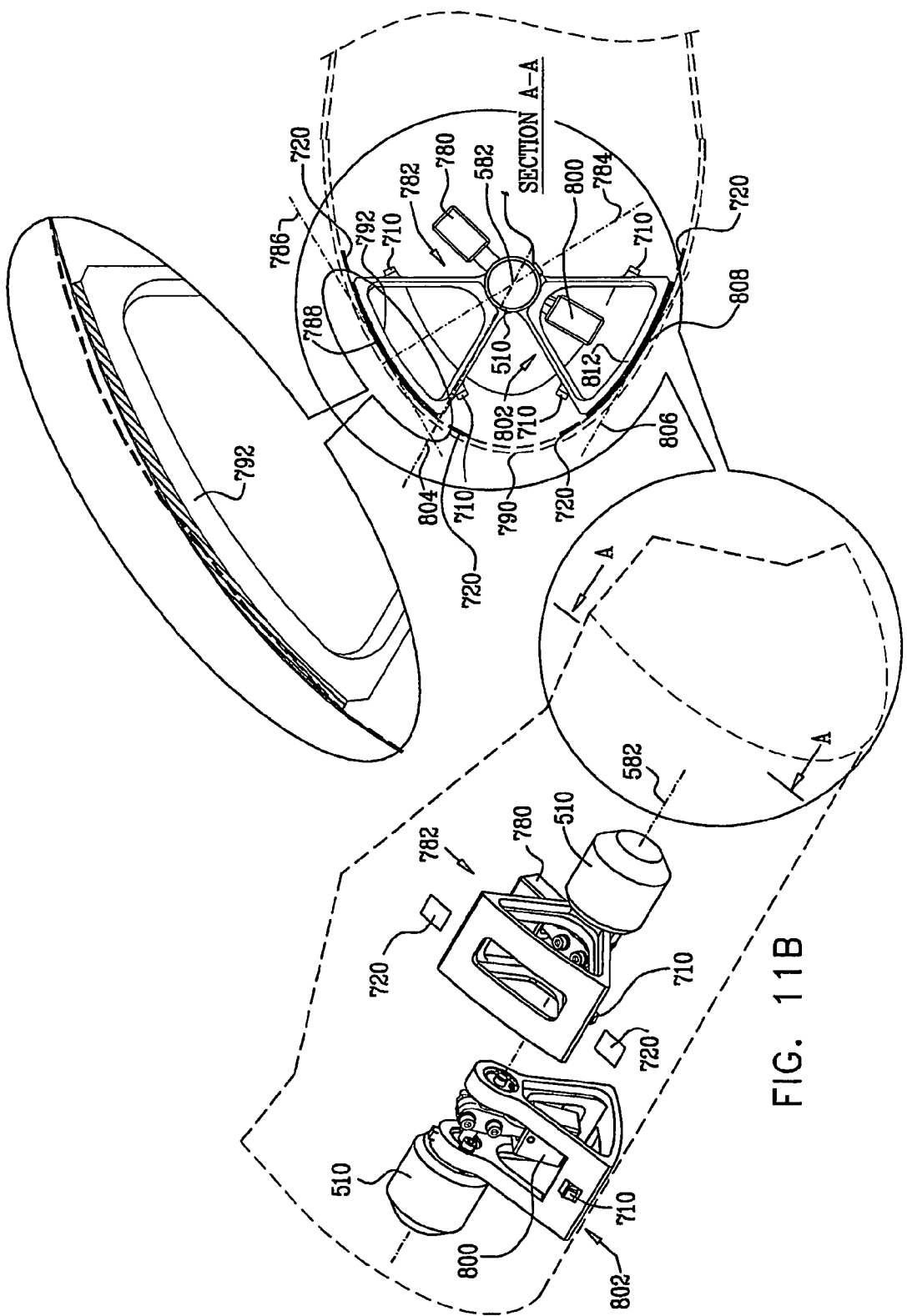

In FIG. 11B, eccentric masses 780 and 800 have been rotated from the position seen in FIG. 11A. As seen in FIG. 11B, eccentric drive mass 780 of displacer assembly 782 is not located along axis 784. Inasmuch as mass 780 lies along an axis which is not perpendicular to surface 788, the displacer assembly 782 is applying a bending force to the leading edge 790.

As also seen in FIG. 11B, eccentric drive mass 800 of displacer assembly 802 is not located along an axis 804 but is nearly perpendicular to axis 804. Inasmuch as mass 800 lies between axis 582 and surface 806, the displacer assembly 802 is applying a push force to the leading edge 790.

FIG. 4B shows, in an exaggerated manner the deformation of the leading edge 790 corresponding to the operational state illustrated in FIG. 11B. The extent of exaggeration is estimated to be a factor of 40.

Figure 11C:
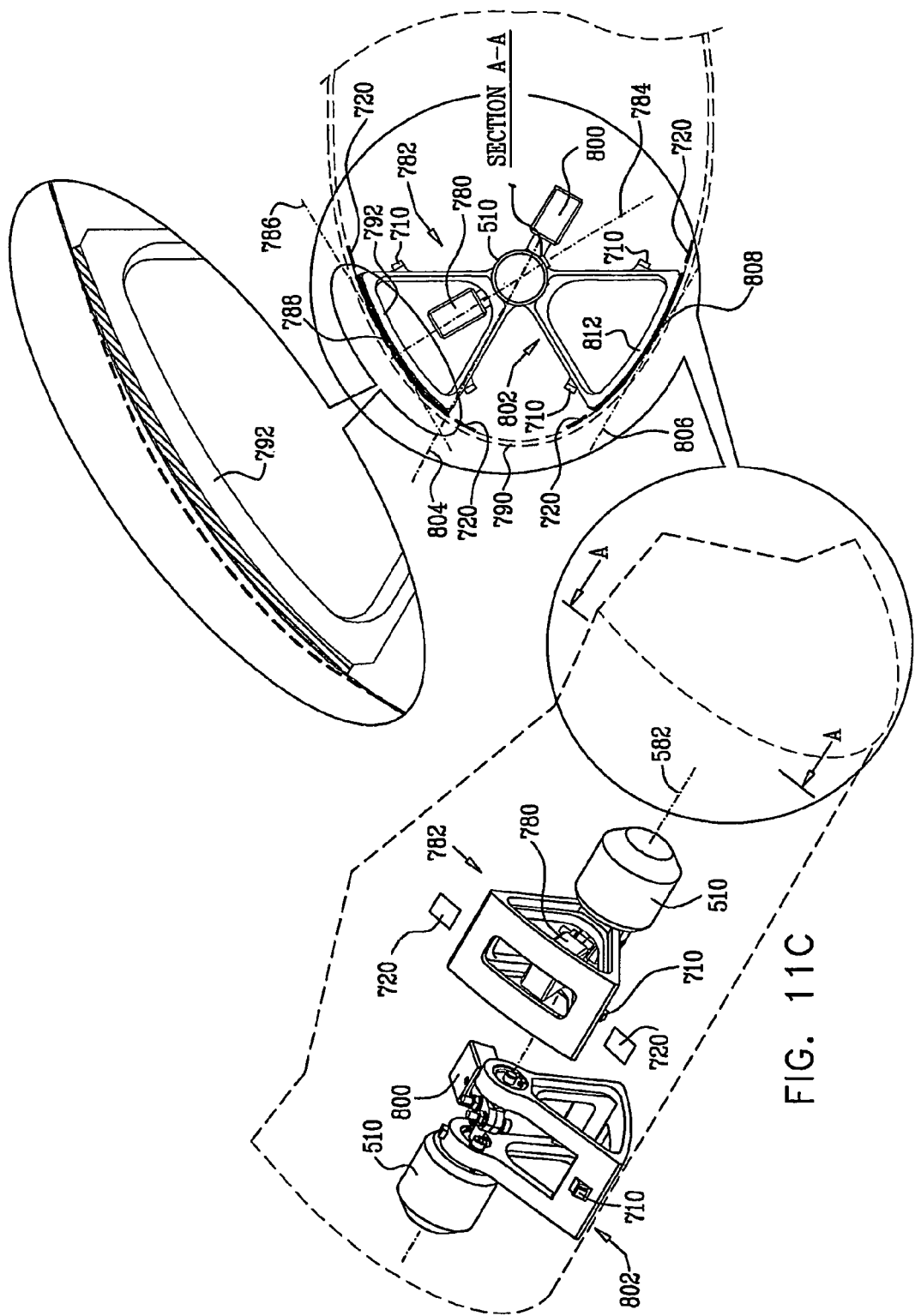

In FIG. 11C, eccentric masses 780 and 800 have been rotated approximately 180° from the position seen in FIG. 11A. As seen in FIG. 11C, eccentric drive mass 780 of displacer assembly 782 is located along axis 784 which passes through axis 582 (FIG. 10) and extends generally perpendicular to the plane defined by tangent 786 to curved surface 788. Inasmuch as mass 780 lies between axis 582 and surface 788, the displacer assembly 782 is applying a push force to the leading edge 790 along axis 784.

As also seen in FIG. 11C, eccentric drive mass 800 of displacer assembly 802 is located along axis 804 which passes through axis 582 (FIG. 10) and extends generally parallel to the plane defined by tangent 806 to curved surface 808. Inasmuch as mass 800 lies along an axis which is not perpendicular to surface 808, the displacer assembly 802 is applying a bending force to the leading edge 790.

FIG. 4C shows, in an exaggerated manner the deformation of the leading edge 790 corresponding to the operational state illustrated in FIG. 11C. The extent of exaggeration is estimated to be a factor of 40.

Figure 11D:
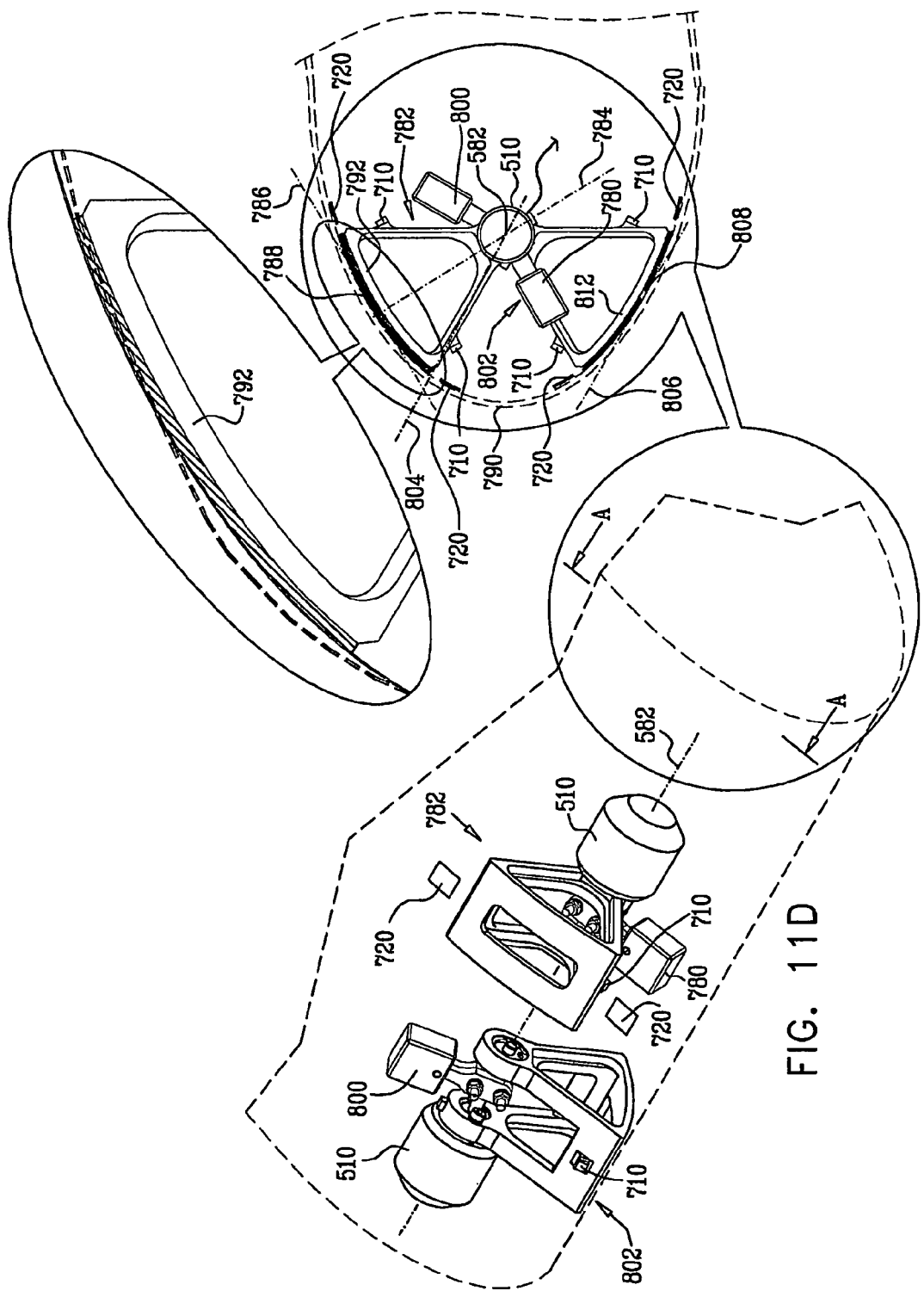

In FIG. 11D, eccentric masses 780 and 800 have been rotated further counterclockwise, as seen from the perspective of the sectional illustration shown along lines A-A therein, from the position seen in FIG. 11A. As seen in FIG. 11D, eccentric drive mass 780 of displacer assembly 782 is not located along axis 784. Inasmuch as mass 780 lies along an axis which is not perpendicular to surface 788, the displacer assembly 782 is applying a bending force to the leading edge 790.

As also seen in FIG. 11D, eccentric drive mass 800 of displacer assembly 802 is not located along an axis 804 but is nearly perpendicular to axis 804. Inasmuch as mass 800 lies beyond axis 582 with respect to surface 806, the displacer assembly 802 is applying a pull force to the leading edge 790.

FIG. 4D shows, in an exaggerated manner the deformation of the leading edge 790 corresponding to the operational state illustrated in FIG. 11D. The extent of exaggeration is estimated to be a factor of 40.

It is appreciated that axis 582 may be oriented at any suitable orientation with respect to an aircraft surface to be deiced and need not be generally parallel thereto as illustrated in the examples.

Reference is now made to FIGS. 12A, 12B, 12C and 12D, which are simplified illustrations, in exaggerated form, of deformation of an aircraft surface responsive to synchronized operation of multiple separate motor driven displacers of the type illustrated in the deicing system of FIGS. 9-11D in accordance with another preferred embodiment of the present invention.

As seen in FIGS. 12A-12D, multiple motor driven displacers driven by multiple motors may be operated in a predetermined sequence, typically at synchronized time intervals, to provide deformation of an aircraft surface and disengagement of ice from the aircraft surface. In the illustrated embodiment seen in FIGS. 12A-12D, the predetermined sequence produces displacement of the aircraft surface which proceeds therealong in a wavelike progression.

It is appreciated that the operation of the multiple motors may be controlled by a centralized controller to provide the predetermined sequence. Additionally or alternatively, each of the multiple motors may have an associated controller, where the multiple controllers are in communication with one another or in communication with a centralized controller.

It will be appreciated by persons skilled in the art that the present invention is not limited by what has been particularly shown and described hereinabove. Rather the present invention includes both combinations and subcombinations of various features described herein and improvements and variations which would occur to persons skilled in the art upon reading the foregoing description and which are not in the prior art.

The invention claimed is:

1. An aircraft deicing system comprising:
at least one motor operative to drive at least one eccentric mass in rotational motion; and
at least one displacer fixed to at least one location on at least one aircraft surface and rotatably supporting a shaft about which said at least one eccentric mass moves in rotational motion, thereby producing inertial forces which are applied via said shaft to said at least one displacer, causing said at least one displacer to displace said at least one aircraft surface in a plurality of directions at each of said at least one location, said plurality of directions corresponding to changing positions of said eccentric mass as it moves in rotational motion about said shaft, thereby causing disengagement of ice from said at least one aircraft surface.

2. An aircraft deicing system according to claim 1 and wherein said at least one displacer is operative in a cyclic manner, wherein each cycle corresponds to a 360 degree rotation of said eccentric mass about said shaft, wherein in each cycle said at least one displacer is operative to displace said at least one aircraft surface in a plurality of directions at each of said at least one location.

3. An aircraft deicing system according to claim 1 and also comprising:
at least one ice thickness sensor, employing at least one of an acceleration sensor and a strain gage for sensing an ice thickness responsive characteristic of said at least one aircraft surface, by sensing displacement of said at least one aircraft surface responsive to said inertial forces produced by motion of said eccentric mass; and
at least one controller responsive to an output of said at least one ice thickness sensor indicating said ice thickness responsive characteristic of said at least one aircraft surface for governing the operation of said at least one motor.

4. An aircraft deicing system according to claim 1 and wherein said at least one motor drives said at least one eccentric mass in rotational motion about a first axis and at least a portion of at least one of said at least one eccentric mass is selectably displaceable along a second axis generally perpendicular to said first axis.

5. An aircraft deicing system according to claim 1 and wherein
said at least one motor comprises a plurality of motors, each of which is operative to drive an eccentric mass in rotational motion; and
said at least one displacer comprises a plurality of displacers, each of which is coupled to a location on said aircraft surface and coupled to said eccentric mass such that forces produced by said rotational motion of said eccentric mass are applied to said displacer, causing said displacer to displace said aircraft surface in a plurality of directions at said location.

6. An aircraft deicing system according to claim 5 and wherein each of said plurality of motors and said eccentric mass and displacer associated therewith is operated in a predetermined sequence with respect to others of said plurality of motors, eccentric masses and displacers associated therewith, thereby causing disengagement of ice from said at least one aircraft surface.

7. An aircraft deicing system according to claim 6 and wherein said predetermined sequence produces displacement of said aircraft surface which proceeds therealong in a wavelike progression.

8. An aircraft deicing system according to claim 1 and wherein said at least one aircraft surface comprises a leading edge of a wing.

9. An aircraft comprising:
an airframe including at least one aircraft surface;
at least one motor operative to drive at least one eccentric mass in rotational motion; and
at least one displacer fixed to at least one location on at least one aircraft surface and rotatably supporting a shaft about which said at least one eccentric mass moves in rotational motion, thereby producing inertial forces which are applied via said shaft to said at least one displacer, causing said at least one displacer to displace said at least one aircraft surface in a plurality of directions at each of said at least one location, said plurality of directions corresponding to changing positions of said eccentric mass as it moves in rotational motion about said shaft, thereby causing disengagement of ice from said at least one aircraft surface.

10. An aircraft according to claim 9 and wherein said at least one displacer is operative in a cyclic manner, wherein each cycle corresponds to a 360 degree rotation of said eccentric mass about said shaft, wherein in each cycle said at least one displacer is operative to displace said at least one aircraft surface in a plurality of directions at each of said at least one location.

11. An aircraft according to claim 9 and also comprising:
at least one ice thickness sensor, employing at least one of an acceleration sensor and a strain gage for sensing an ice thickness responsive characteristic of said at least one aircraft surface, by sensing displacement of said at least one aircraft surface responsive to said inertial forces produced by motion of said eccentric mass; and
at least one controller responsive to an output of said at least one ice thickness sensor indicating said ice thickness responsive characteristic of said at least one aircraft surface for governing the operation of said at least one motor.

12. An aircraft according to claim 9 and wherein said at least one motor drives said at least one eccentric mass in rotational motion about a first axis and at least a portion of at least one of said at least one eccentric mass is selectably displaceable along a second axis generally perpendicular to said first axis.

13. An aircraft according to claim 9 and wherein said at least one motor comprises a plurality of motors, each of which is operative to drive an eccentric mass in rotational motion; and said at least one displacer comprises a plurality of displacers, each of which is coupled to a location on said aircraft surface and coupled to said eccentric mass such that forces produced by said rotational motion of said eccentric mass are applied to said displacer, causing said displacer to displace said aircraft surface in a plurality of directions at said location.

14. An aircraft according to claim 13 and wherein each of said plurality of motors and said eccentric mass and displacer associated therewith is operated in a predetermined sequence with respect to others of said plurality of motors, eccentric masses and displacers associated therewith, thereby causing disengagement of ice from said at least one aircraft surface.

15. An aircraft according to claim 14 and wherein said predetermined sequence produces displacement of said aircraft surface which proceeds therealong in a wavelike progression.

16. An aircraft according to claim 9 and wherein said at least one aircraft surface comprises a leading edge of a wing.

\* \* \* \* \*